US011166157B2

(12) United States Patent
Olshansky et al.

(10) Patent No.: US 11,166,157 B2
(45) Date of Patent: Nov. 2, 2021

(54) DISTRIBUTED MANAGEMENT OF SECURE WI-FI NETWORK

(71) Applicant: NOMADIX, INC., Woodland Hills, CA (US)

(72) Inventors: Vadim Olshansky, Tarzana, CA (US); Gaurav Jain, Moorpark, CA (US)

(73) Assignee: Nomadix, Inc., Woodland Hills, CA (US)

( * ) Notice: Subject to any disclaimer, the term of this patent is extended or adjusted under 35 U.S.C. 154(b) by 0 days.

(21) Appl. No.: 16/900,355

(22) Filed: Jun. 12, 2020

(65) Prior Publication Data

US 2020/0396604 A1    Dec. 17, 2020

Related U.S. Application Data

(60) Provisional application No. 62/936,260, filed on Nov. 15, 2019, provisional application No. 62/862,619, filed on Jun. 17, 2019, provisional application No. 62/861,943, filed on Jun. 14, 2019.

(51) Int. Cl.
| | | |
|---|---|---|
| *G06F 3/048* | (2013.01) | |
| *H04W 12/0433* | (2021.01) | |
| *H04W 12/069* | (2021.01) | |
| *G06F 3/0484* | (2013.01) | |
| *H04W 84/12* | (2009.01) | |

(52) U.S. Cl.
CPC ..... *H04W 12/0433* (2021.01); *H04W 12/069* (2021.01); *G06F 3/0484* (2013.01); *H04W 84/12* (2013.01)

(58) Field of Classification Search
CPC .................................................. G06F 3/0484
See application file for complete search history.

(56) References Cited

U.S. PATENT DOCUMENTS

| | | | |
|---|---|---|---|
| 8,532,304 B2 * | 9/2013 | Asokan | H04L 63/18 380/284 |
| 2010/0115278 A1 * | 5/2010 | Shen | H04L 63/061 713/171 |
| 2015/0310896 A1 * | 10/2015 | Bredow | G06F 3/0484 386/230 |
| 2016/0192186 A1 | 6/2016 | Lin | |

(Continued)

OTHER PUBLICATIONS

International Search Report and Written Opinion received in PCT Application No. PCT/US2020/037517, dated Jul. 29, 2020 in 13 pages.

*Primary Examiner* — David E Choi
(74) *Attorney, Agent, or Firm* — Knobbe, Martens, Olson & Bear, LLP

(57) ABSTRACT

Generally described, the presently disclosed technology utilizes managed Wi-Fi networks pre-installed throughout an MDU property to provide user-specific passphrases that can be used to access the single-SSID wireless network at the property and to provide a cloud portal that can enable convenient access to the functionalities (both by the resident and the manager) provided by the Wi-Fi controller and the Wi-Fi access points. By doing so, the Wi-Fi network management solutions described herein allow the users to experience the benefits of a shared Wi-Fi infrastructure, such as not having to set up and maintain their own Wi-Fi routers, while also allowing them to easily change their Wi-Fi settings from their connected devices.

20 Claims, 29 Drawing Sheets

(56) References Cited

U.S. PATENT DOCUMENTS

| | | |
|---|---|---|
| 2017/0272317 A1 | 9/2017 | Singla et al. |
| 2017/0366970 A1 | 12/2017 | Yu |
| 2018/0337782 A1* | 11/2018 | Wu .................. H04L 9/0836 |
| 2020/0396604 A1* | 12/2020 | Olshansky .......... H04W 12/069 |

* cited by examiner

How to Change Wi-Fi Password

If you would like to reset your Wi-Fi password(s), visit/register at https://thepark.myezwifi.com Your login ID is terry@myemail.com

Contact Us

Please retain these instructions for future reference.
You can also contact us at 123-456-7890.

---

Your Guest Wi-Fi Password has been reset!

Hello Terry,

Please use the following Wi-Fi password for your guest devices.

Smartphone:
1. Open Settings
2. Go to Wi-Fi
3. Search "Thomas Tower" and tap on it. (Wi-Fi SSID)
4. Enter the following Wi-Fi password: Clone.Symantec.Variety86

Alternatively, your guests can point their smartphone camera at the QR code, and it will connect to Wi-Fi automatically (most smartphones relased after 2017 support it)

Laptops, TVs, and other devises:
1. Open Settings
2. Go to Wi-Fi
3. Search for "Thomas Tower" and tap on it. (Wi-Fi SSID)
4. Enter the following Wi-Fi password: Clone.Symantec.Variety86

FIG. 14G

How to Change Wi-Fi Password
If you would like to reset your Wi-Fi password(s), visit/register at https://thepark.myezwifi.com Your login ID is terry@myemail.com

Contact Us
Please retain these instructions for future reference.
You can also contact us at 123-456-7890.

Your Personal Wi-Fi Password has been reset!
Hello Terry,

Please re-configure all your devises with the new Wi-Fi password. Your old password will remain active for another 2 Hours.

Smartphone:
1. Open Settings
2. Go to Wi-Fi
3. Search "rs- agoura-07" and tap on it. (Wi-Fi SSID)
4. Enter the following Wi-Fi password: Paths.Survey.Antique35
5. You are connected!

Alternatively, you can point your smartphone camera at the QR code, and it will connect to Wi-Fi automatically (most smartphones relased after 2017 support it)

Laptops, TVs, and other Devises:
1. Open Settings
2. Go to Wi-Fi
3. Search for "rs-agoura-07 and tap on it. (Wi-Fi SSID)
4. Enter the following Wi-Fi password: Paths.Survey.Antique35
5. You are connected!

DISTRIBUTED MANAGEMENT OF SECURE WI-FI NETWORK

CROSS-REFERENCE TO RELATED APPLICATIONS

This application is a nonprovisional of U.S. Provisional Application No. 62/861,943, filed Jun. 14, 2019, titled "DISTRIBUTED MANAGEMENT OF SECURE WI-FI NETWORK," U.S. Provisional Application No. 62/862,619, filed Jun. 17, 2019, titled "DISTRIBUTED MANAGEMENT OF SECURE WI-FI NETWORK," and U.S. Provisional Application No. 62/936,260, filed Nov. 15, 2019, titled "DISTRIBUTED MANAGEMENT OF SECURE WI-FI NETWORK," all disclosures of which are hereby incorporated by reference in their entirety.

TECHNICAL FIELD

The present disclosure relates to the field of providing computer network access.

BACKGROUND

A network management system can be used to provide access to a network, such as the Internet, to multiple users. Some types of network management systems can be used to provide access to multiple users and their corresponding network capable user devices. Network management systems can be used to control internet access in public and private venues. At a given time, network management systems may manage hundreds or thousands of user devices requesting content from the Internet.

BRIEF DESCRIPTION OF THE DRAWINGS

The implementations described herein are illustrated by way of example, and not by way of limitation, in the figures of the accompanying drawings in which like references indicate similar elements.

DETAILED DESCRIPTION

Introduction

Figure 1:
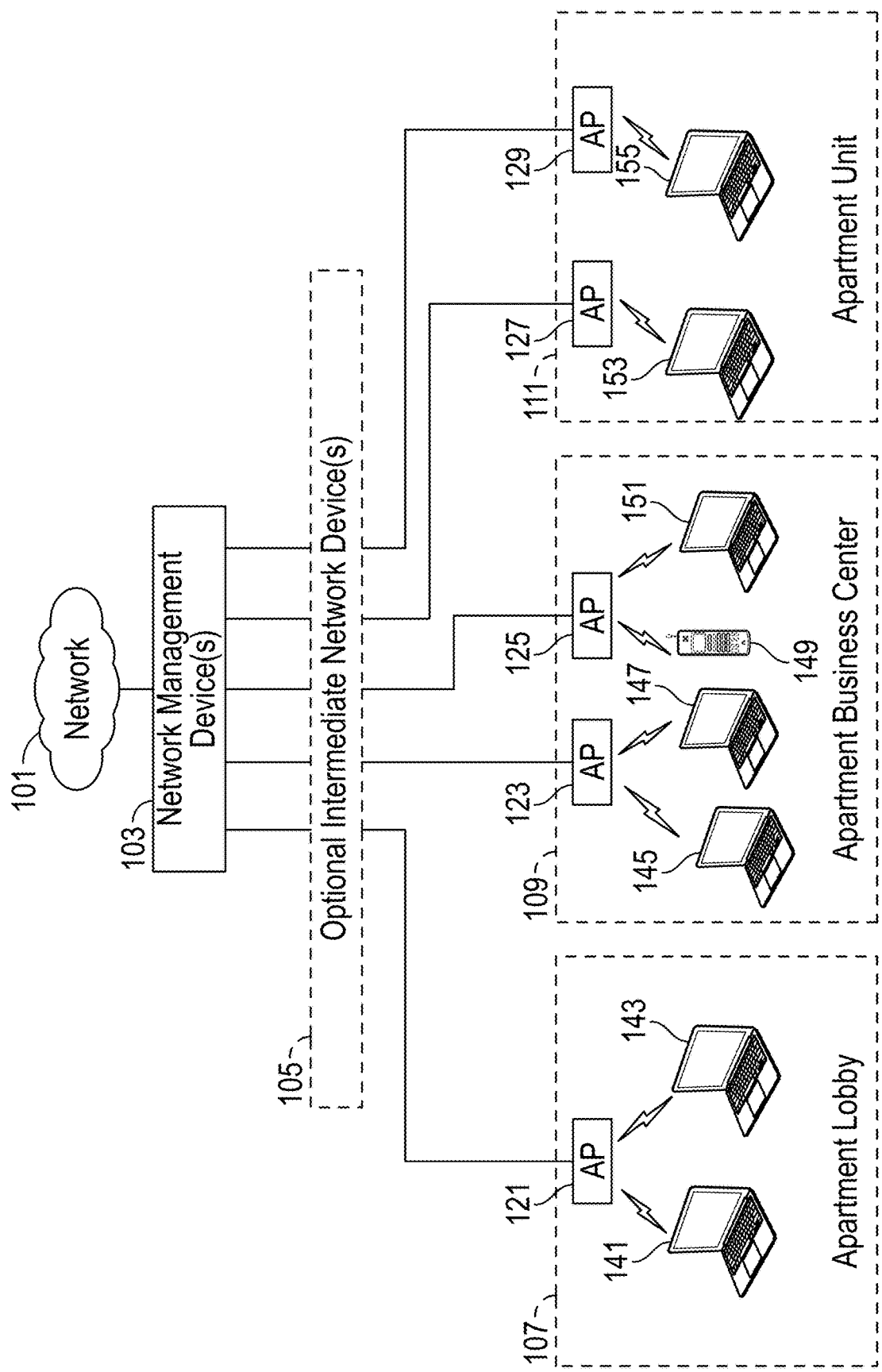
FIG. 1 schematically illustrates an implementation of a network.

In the hospitality industry, the guests typically change their place of enrollment more frequently (e.g., the duration of stay is typically shorter) as compared to other establishments such as apartment complexes. Thus, for example, when hotel guests are provided Wi-Fi access for the duration of their stay, the hotel's shared Wi-Fi infrastructure does not allow such hotel guests to modify their Wi-Fi access in any way (e.g., change their Wi-Fi passwords, and so on). However, at a property at which the occupants stay much longer (e.g., apartment complexes), the occupants (e.g., residents staying in the apartment complexes) may want the flexibility of being able to manage their own Wi-Fi access settings. Additionally, the occupants may even want to create a guest password that they can provide to their visitors. Thus, an improved method of allowing users of a shared Wi-Fi infrastructure to manage and update their own Wi-Fi settings is provided by this disclosure.

The aforementioned challenges, among others, are addressed in some implementations by the disclosed techniques for Wi-Fi network management. More specifically, the presently disclosed technology addresses these deficiencies by utilizing managed Wi-Fi networks pre-installed throughout an MDU property, providing user-specific passphrases that can be used to access the single-SSID wireless network, and providing a cloud portal that can enable convenient access to the functionalities (both by the resident and the manager) provided by the Wi-Fi controller and the Wi-Fi access points. By doing so, the Wi-Fi network management solutions described herein allow the users to experience the benefits of a shared Wi-Fi infrastructure, such as not having to set up and maintain their own Wi-Fi routers, while also allowing them to easily change their Wi-Fi settings from their connected devices.

Technical Advantages

According to one or more implementations of the present disclosure, a secure single-SSID wireless system (or a system that includes a plurality of single-SSID wireless systems) can be implemented where the system allows building-wide or property-wide wireless access via the same SSID and also allows the residents, guests, or users of the system to manage their own pre-shared keys (PSKs) to create a virtual private network (or virtual personal area network) that connect their network devices such as laptops, smartphones, and tablets. The techniques described herein allow the users to experience the benefits of a shared Wi-Fi infrastructure, such as not having to set up and maintain their own Wi-Fi routers in their apartment units, while also allowing them to easily change their Wi-Fi settings from their connected devices. This eliminates the need to contact their Internet service provider or their property manager to change their Wi-Fi settings). For example, residents may no longer be required to install personal home routers or network equipment that ultimately compete for radio frequency and cause poor and inconsistent Wi-Fi connectivity. Instead, residents can connect to a single SSID and make use of pre-installed Wi-Fi and wired infrastructure at the property. Additionally, using an intuitive interface, residents also have the ability to self-manage their own Wi-Fi settings, change passwords, and add devices without calling support. Property managers, whether managing one building or hundreds of buildings, can easily provision new Wi-Fi service for residents with easy-to-use drop-down menus.

Further, in the shared infrastructure described herein, the frequencies of the Wi-Fi signals can be coordinated such that interference among residents' Wi-Fi signals can be reduced or minimized. For example, the owner of an MDU property may pre-install managed Wi-Fi networks throughout multiple buildings or facilities, eliminating the need for each resident to set up their own dedicated home routers or equipment and ensuring a secure connection and consistent signal for all users. Additionally, the user interfaces provided by the system described herein allow the users to easily toggle through configuration menus and configure resident settings and guest settings.

As will be appreciated by one of skill in the art in light of the present disclosure, the implementations disclosed herein improve the ability of computing systems, such as networking systems and wireless communications systems, to provide mechanisms for allowing users to manage their own Wi-Fi settings for a single-SSID wireless network without having to set up and manage their own wireless equipment. Prior techniques generally relied on having the users set up their own equipment (e.g., wireless router) in their units. However, such approaches would result in interference among residents' Wi-Fi signals depending on the number of residents in a given area/building, and also result in poor signal quality depending on where the Wi-Fi access is requested (and the Wi-Fi signal is typically limited to the unit, and does not extend to other units or other parts of the property).

In contrast, implementations of the present disclosure enable property-wide Wi-Fi access with a single-SSID wireless network while also allowing convenient access (by both residents and property managers) to the Wi-Fi settings. Further, the techniques of the present disclosure allow convenient configuration of virtual private networks that can connect multiple devices that belong to the same resident or to the same unit, enabling direct communication among the connected devices.

The presently disclosed implementations therefore address technical problems inherent within computing systems and wireless communications systems, such as the inability of a user to conveniently configure Wi-Fi settings of a single-SSID wireless network and the signal strength and interference issues described above with user-configured wireless equipment. These technical problems are addressed by the various technical solutions described herein, including configuring the various network components (including the cloud portal, Wi-Fi controller, and Wi-Fi PSK manager) to perform the various operations described here. Thus, the present disclosure represents an improvement on existing networking systems and wireless communications systems, and computing systems in general. One or more of the network components described herein (e.g., cloud portal, Wi-Fi controller, Wi-Fi PSK manager, gateway, etc.) may include hardware computer memory and/or processors, an operating system that provides executable program instructions for the general administration and operation of that network component, and/or a computer-readable medium storing instructions that, when executed by a processor of the network component, allow the network component to perform its intended functions. Two or more of the network components described herein may be implemented on a single computing system or server.

These and other aspects of the disclosure will now be described with regard to certain examples and implementations, which are intended to illustrate but not limit the disclosure. Although the examples and implementations described herein will focus, for the purpose of illustration, on specific calculations and algorithms, one of skill in the art will appreciate the examples are illustrate only, and are not intended to be limiting.

Network Access System

FIG. 1 schematically illustrates an implementation of a network access system. The system includes various user devices 141, 143, 145, 147, 149, 151, 153, 155. User devices can include, such as, for example, laptops, desktop computers, smartphones, PDAs and any other wired or wireless network enabled communication devices. The user devices 141, 143, 145, 147, 149, 151, 153, 155 communicate with access points 121, 123, 125, 127, 129. Access points 121, 123, 125, 127, 129 provide wired or wireless communications with network management device(s) 103. The network management device(s) 103 control network communications in-between access points and between the access points and network 101. In some implementations, the network management device(s) 103 are operated by a single entity. In an implementation, the network management device(s) 103 create a single network. Optionally, intermediate network device(s) 105 can also be used, including, for example, routers, switches, hubs, repeaters, etc. to assist in providing communications between access points 121, 123, 125, 127 and network management device(s) 103. The network 101 can be, for example, a public network such as the Internet. Network management device(s) 103 can include network gateways, such as, for example, network access gateways commercially available from Nomadix, Inc. of Agoura Hills, Calif. As will be understood by those of skill in the art from the present disclosure, other network management devices can also be used.

Devices are generally programmed to automatically select between access points, by, for example, determining which access point provides the strongest signal. A device may be in between three different access points and is able to communicate with all of them, but will eventually choose one access point to communicate with. In some cases, an access point will not allow a device to communicate through it, in which case the user device will attempt to communicate with another access point. For example, a user device may have the strongest signal with access point A, but may only be authenticated with access point B. In this case, the user devices will communicate with access point B despite the weaker signal. As will be understood, user devices can be configured to select access points based on any number of different selection options, including, for example, signal strength, bandwidth availability, access rights, access points corresponding to a particular SSID, etc. When an access point is out of range, a user device will no longer be able to communicate with it and will attempt to find another access point. In an implementation, switching between access points is seamless, e.g. there is no loss of network session, and a user may not even realize that they have switched access points.

As illustrated in FIG. 1, the network includes multiple physical areas including apartment lobby 107, apartment business center 109 and apartment unit 111. Although not shown in FIG. 1, the network may include additional apartment lobbies, apartment business centers, and/or apartment units. Each physical area may include one or more access points. In some cases, two or more physical areas may share a single access point.

In some implementations, access points advertise their presence by broadcasting a Service Set Identifier (SSID), Extended Service Set Identifier (ESSID), and/or Basic Service Set Identifier (BSSID), or the like, collectively referred to herein as SSID. In some implementations, the same SSID is assigned to all access points in a network. In other implementations, a different SSID is assigned to each access point or a group of access points (or to each region or group of regions) in the network. In yet other implementations, multiple SSID's can be assigned to the same set of access points. In this respect virtual SSID's can be set up corresponding to different groupings of access points. The network management device(s) 103 may provide different levels of service to different users across multiple SSID's or across the same SSID based on the users' pre-shared keys (e.g., Wi-Fi passwords).

Levels of Service

Because the bandwidth accessed by all users can be centrally managed (e.g., by the wireless controller or wireless PSK manager described herein, bandwidth limits can be set per user, per device, or per user type (e.g., resident or guest), regardless of the number of devices each subscriber might have. In an implementation, within a single SSID network, different levels of bandwidth (minimum and/or maximum), different levels of service, and/or different levels of access priority can be assigned to different Wi-Fi passwords (e.g., WPA2 PSK). For example, each apartment unit may be assigned one or more Wi-Fi passwords within a single SSID network, and the assigned Wi-Fi passwords may have different levels of bandwidth (minimum and/or maximum), different levels of service, and/or different levels of access priority (e.g., resident vs. guest, resident A vs. resident B, and so on).

Multi-Dwelling Units (MDUs)

Figure 2:
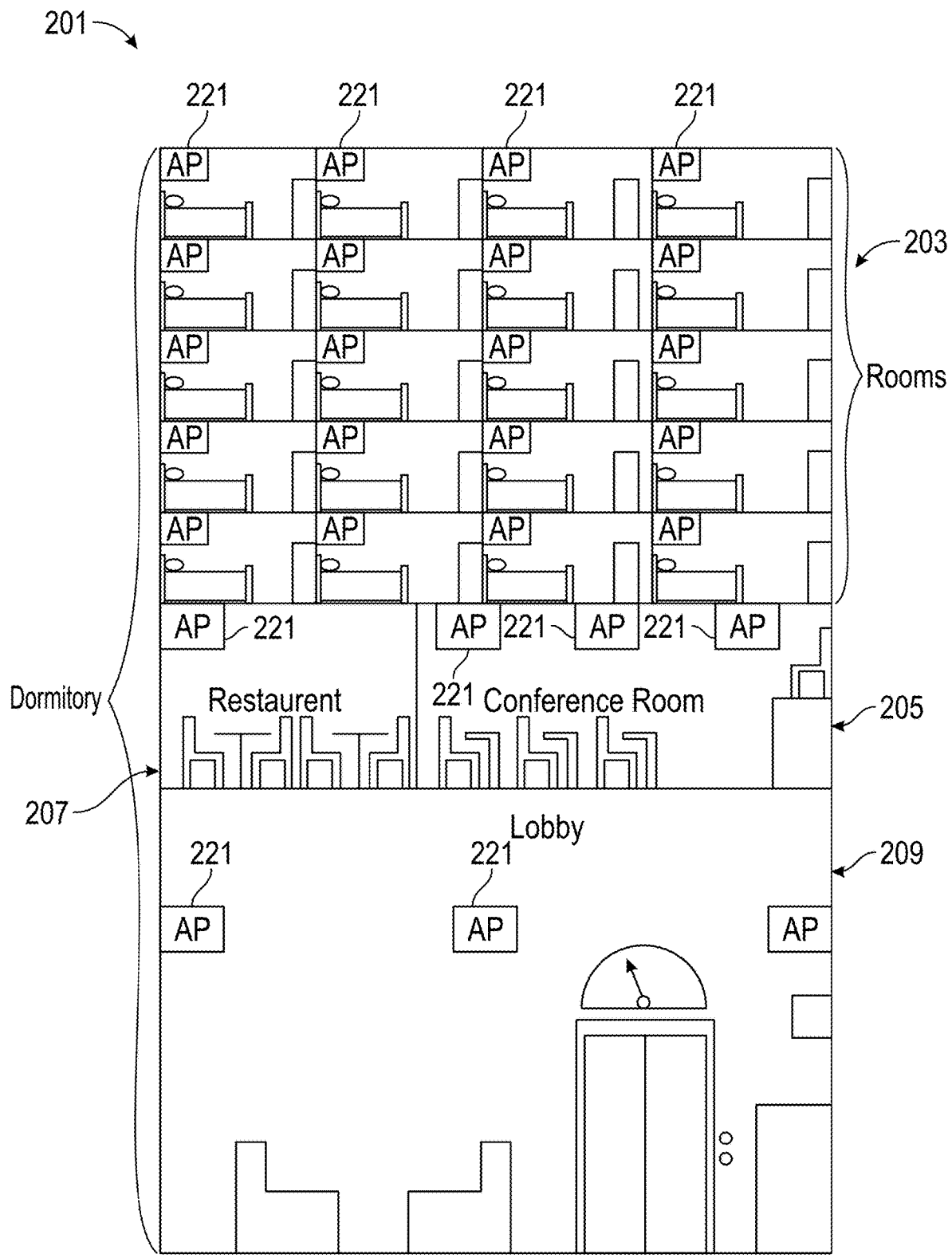
FIG. 2 illustrates a cross-section of various access points in the context of multi-dwelling units (MDUs).

FIG. 2 illustrates a cross-section of various access points in the context of MDUs. Dormitory 201 includes rooms 203, conference room 205, restaurant 207 and lobby 209. The rooms 203, conference room 205, restaurant 207 and lobby 209 include various access points 221. Although illustrated as having one or more access points in each room, it is to be understood that fewer or more access points can be used. For example, in an implementation, a single access point can be used for multiple rooms. As will also be understood by those of skill in the art, many different types of facilities will benefit from the present disclosure. For example, although described mainly with respect to dormitories, other facilities can use the present network management system including apartment complexes, schools, colleges, universities, hospitals, hotels, government buildings, businesses, or any other public or private networking systems.

Modifying Wi-Fi WPA2 PSK on Wi-Fi Controller

Figure 3A:
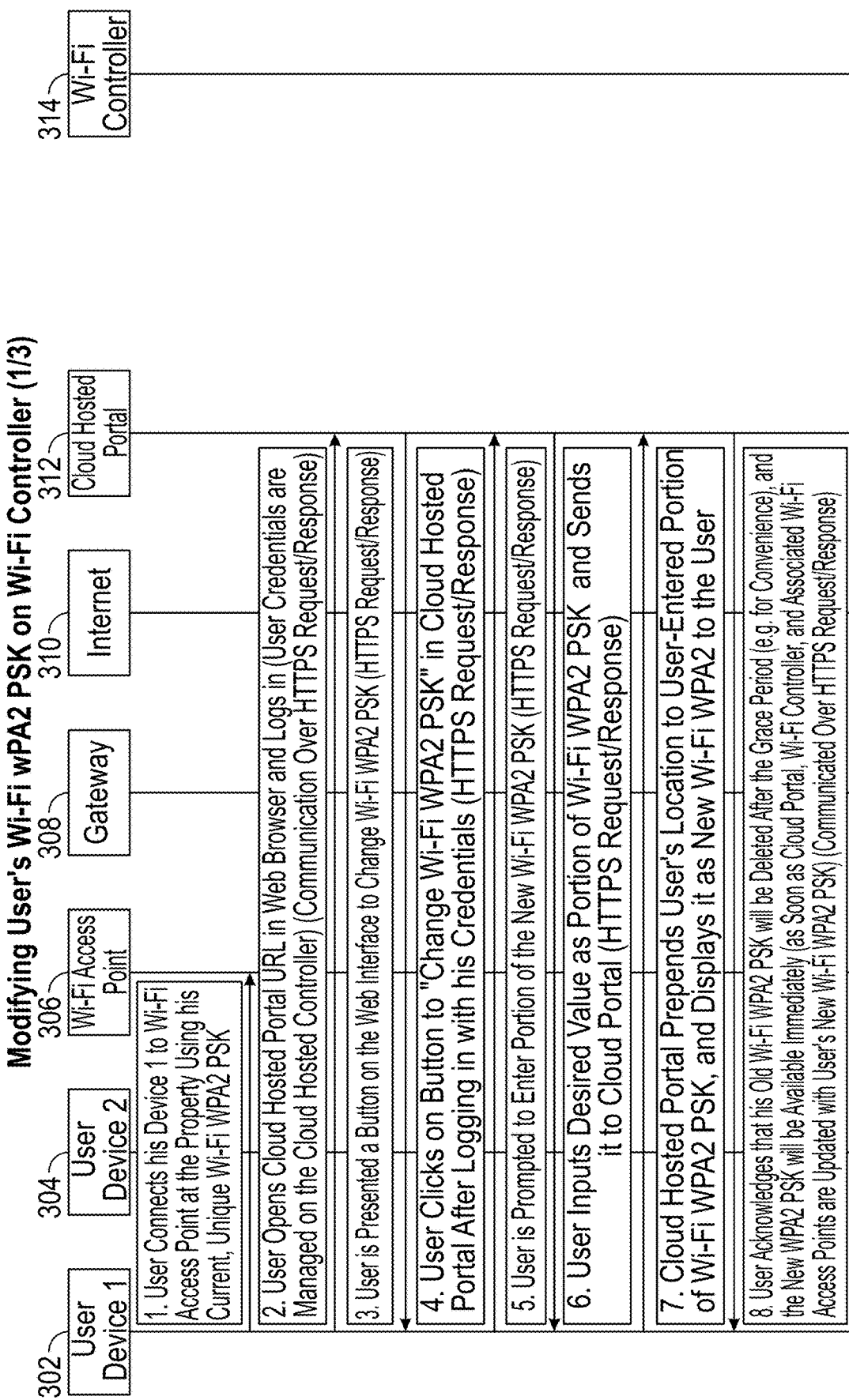
FIGS. 3A-3C illustrate a process flow for modifying a user's pre-shared key in accordance with aspects of this disclosure.
Figure 3B:
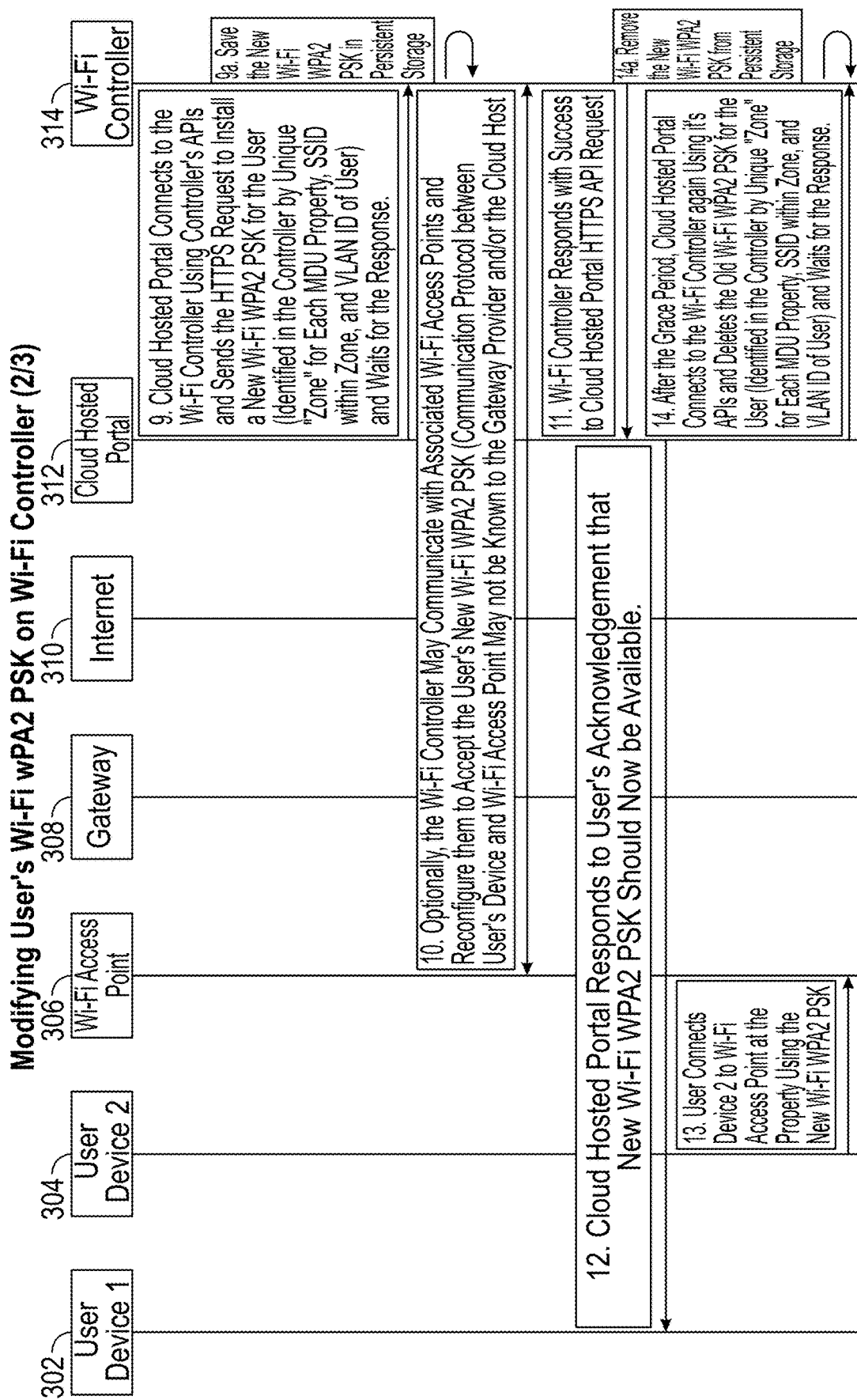
Figure 3C:
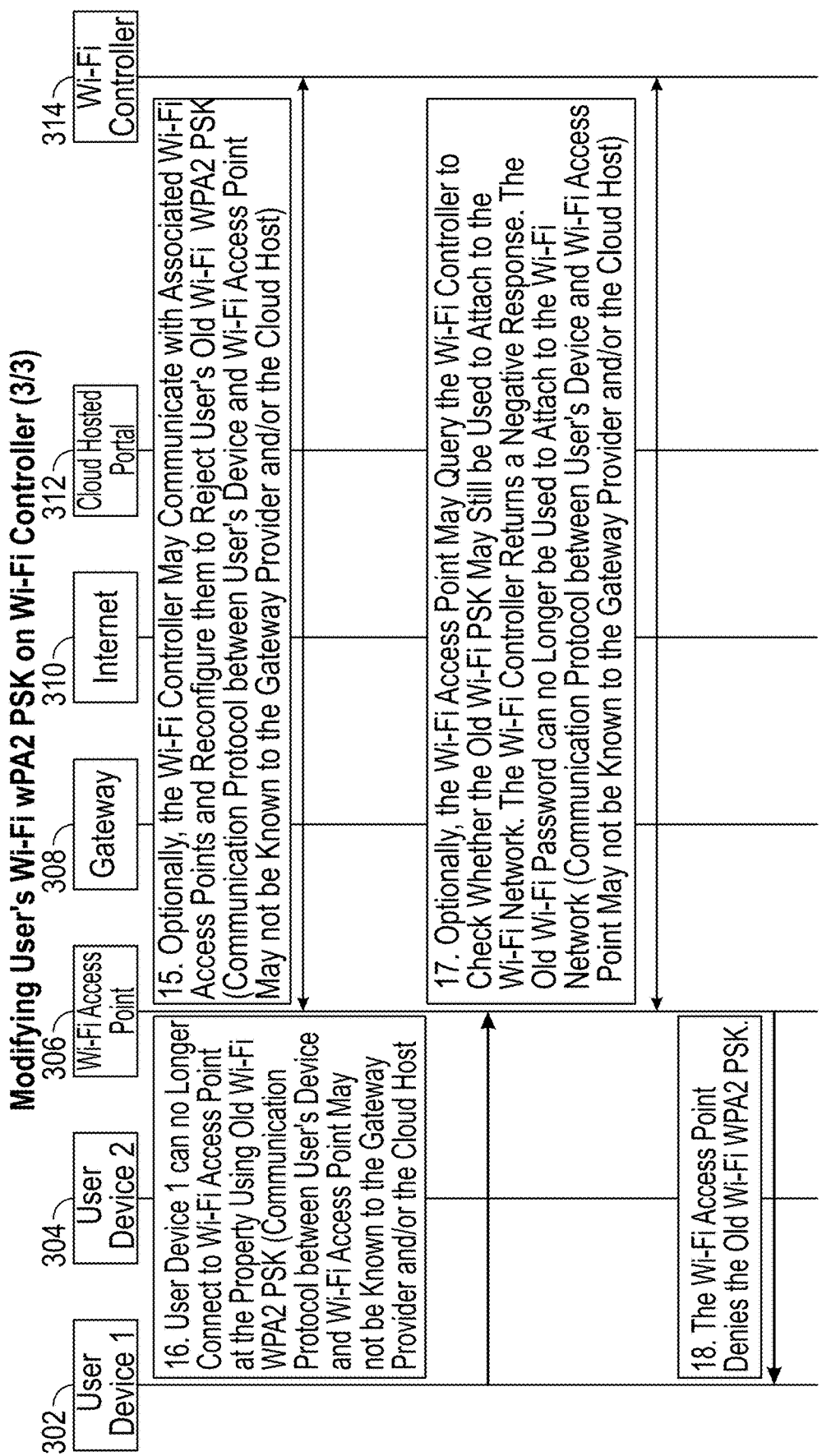

FIGS. 3A-3C illustrate a process flow for modifying the Wi-Fi WPA2 PSK on a Wi-Fi controller. The Wi-Fi controller described herein may be a wireless controller or a network controller that can access, monitor, manage, and control the access points and other network elements described herein. The Wi-Fi controller may provide application programming interfaces (APIs) that other components in the wireless network environment can call to utilize the various functionalities provided by the Wi-Fi controller (e.g., adding, removing, or updating the pre-shared key settings onto the Wi-Fi access points). In some implementations, the Wi-Fi controller and the Wi-Fi access points are manufactured and/or managed by the same entity. In other implementations, the Wi-Fi controller and the Wi-Fi access points are manufactured and/or managed by different entities. The entity (or entities) manufacturing or managing the Wi-Fi controller and the Wi-Fi access points may be different from the entity manufacturing or managing the gateway device described herein. Although WPA2 is used as an example in FIG. 3, the techniques described herein can be applied to other WPA versions (e.g., WPA, WPA3, or future versions) and/or other security protocols.

As shown in FIGS. 3A-3C, the user connects a first user device to the Wi-Fi access point at the property using his current, unique Wi-Fi WPA2 PSK. Then the user accesses the cloud-hosted portal URL in a web browser on the first user device and logs in (e.g., user credentials are managed on the cloud-hosted controller, and the communication occurs over HTTPS request/response). The user is then presented with a button on the web interface to change Wi-Fi WPA2 PSK (HTTPS request/response). In response, the user clicks on the button to "change Wi-Fi WPA2 PSK" in the cloud-hosted portal after logging in with his credentials (HTTPS request/response). The user is then prompted to enter portion of the new Wi-Fi WPA2 PSK (HTTPS request/response). The user inputs desired value as portion of Wi-Fi WPA2 PSK and sends it to the cloud portal (HTTPS request/response). In response, the cloud-hosted portal prepends the user's location to the user-entered portion of Wi-Fi WPA2 PSK, and displays it as new Wi-Fi WPA2 PSK to the user. The user acknowledges that his old Wi-Fi WPA2 PSK will be deleted after the grace period (e.g. 2-hour grace period for the user's convenience so the user has time to update the password on other connected devices), and the new WPA2 PSK will be available immediately (e.g., as soon as the cloud portal, Wi-Fi controller, and associated Wi-Fi access points are updated with user's new Wi-Fi WPA2 PSK) (communicated over HTTPS request/response).

The cloud-hosted portal then connects to the Wi-Fi controller using controller's APIs and sends the HTTPS request to install a new Wi-Fi WPA2 PSK for the user (e.g., identified in the controller by unique "zone" for each MDU property, SSID within zone, and VLAN ID of the user) and waits for the response. The Wi-Fi controller saves the new Wi-Fi WPA2 PSK in persistent storage. Optionally, the Wi-Fi controller communicates with associated Wi-Fi access points and reconfigures them to accept the user's new Wi-Fi WPA2 PSK (e.g., using communication protocol that may be unknown to the gateway provider and/or the cloud host). The Wi-Fi controller responds with success to the cloud-hosted portal's HTTPS API request. The cloud-hosted portal responds to the user, acknowledging that new Wi-Fi WPA2 PSK should now be available. The user then connects a second user device to the Wi-Fi access point at the property using the new Wi-Fi WPA2 PSK. In some implementations, new devices connecting to the single-SSID Wi-Fi network described herein does not need to register their MAC addresses (or other unique identifying information) prior to being granted Wi-Fi access, thereby simplifying the new device registration process (e.g., all that the user needs to add to the new device is the resident password or guest password). In other implementations, new devices connecting to the single-SSID Wi-Fi network described herein does need to register their MAC addresses (or other unique identifying information) prior to being granted Wi-Fi access. In some implementations, each user/resident/subscriber is provided a Wi-Fi passphrase (Wi-Fi WPA2 key) that can be used to onboard devices, without requiring a MAC address. Even "headless" devices like Nest thermostats or Xboxes can access the Wi-Fi network simply by following manufacturer's instructions.

After the grace period, the cloud-hosted portal connects to the Wi-Fi controller again using its APIs and deletes the old Wi-Fi WPA2 PSK for the user (e.g., identified in the controller by unique "zone" for each MDU property, SSID within zone, and VLAN ID of user) and waits for the response. The Wi-Fi controller removes the old Wi-Fi WPA2 PSK from persistent storage. Alternatively, or additionally, the Wi-Fi controller removes the new Wi-Fi WPA2 PSK. Optionally, the Wi-Fi controller communicates with associated Wi-Fi access points and reconfigures them to reject the user's old Wi-Fi WPA2 PSK (e.g., using communication protocol that may be unknown to the gateway provider and/or the cloud host). As a result, the first user device, which may still be using the old password, can no longer connect to the Wi-Fi access point at the property using old Wi-Fi WPA2 PSK (e.g., communication protocol between user's device and Wi-Fi access point may not be known to the gateway provider and/or the cloud host). Optionally, the Wi-Fi access point may query the Wi-Fi controller to check whether the old Wi-Fi PSK may still be used to attach to the Wi-Fi network. The Wi-Fi controller returns a negative response. The old Wi-Fi password can no longer be used to attach to the Wi-Fi network (communication protocol between the user's device and Wi-Fi access point may not be known to the gateway provider and/or the cloud host). As shown, the Wi-Fi access point denies the old Wi-Fi WPA2 PSK.

Although the method of FIG. 3 is described as using certain protocols (e.g., the HTTPS protocol), in other implementations, other protocols may be used to perform the same or similar technique.

Pre-Shared Key Modification Method

Figure 4:
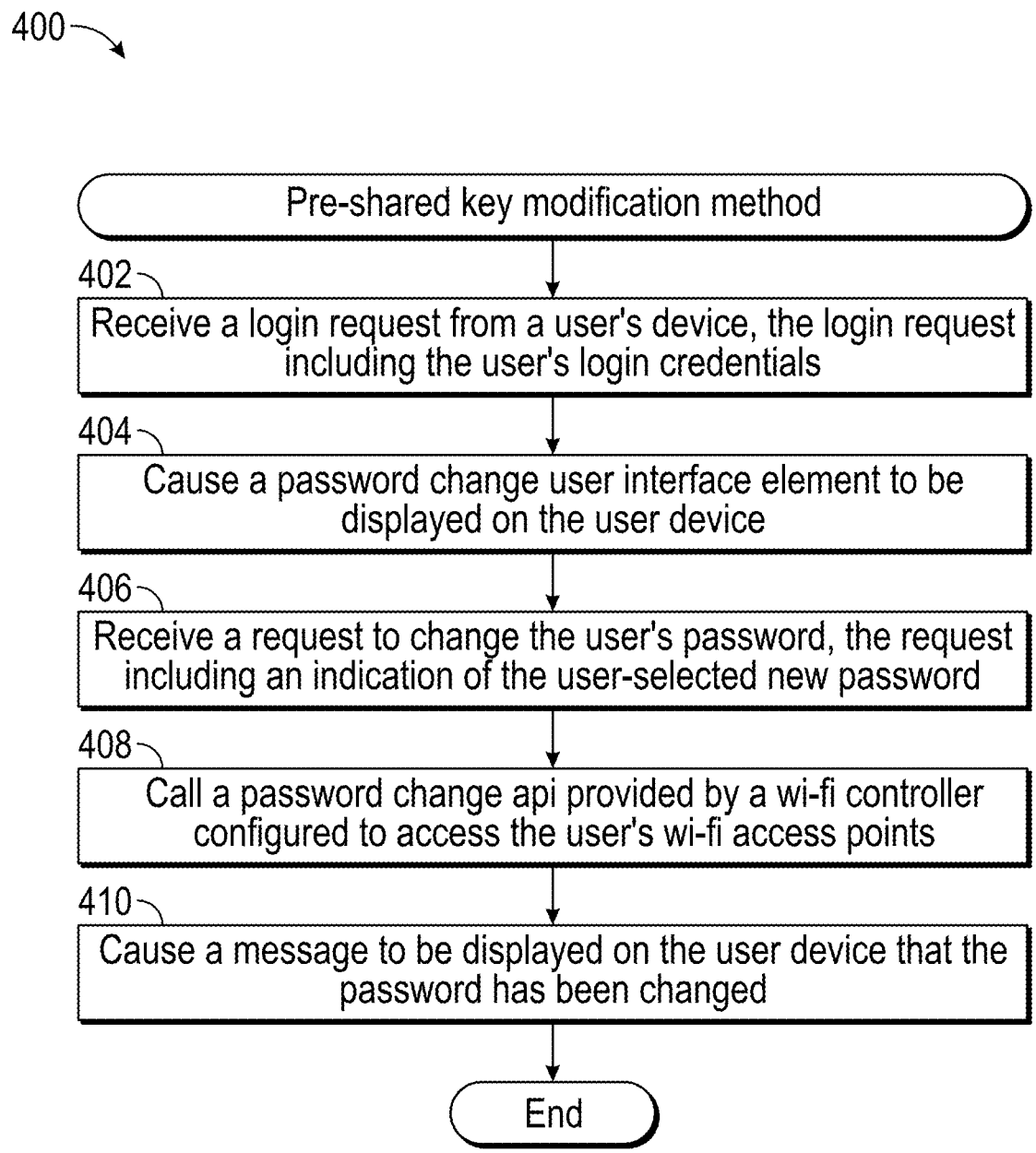
FIG. 4 illustrates an example pre-shared key modification method in accordance with aspects of this disclosure.

With reference now to FIG. 4, an example pre-shared key modification method 400 will be described. The example method 400 may be carried out, for example, by the cloud-hosted portal described in FIG. 3. The method 400 illustrates an example algorithm that may be programmed, using any suitable programming environment or language, to create machine code capable of execution by a CPU or microcontroller. Various implementations may be coded using assembly, C, OBJECTIVE-C, C++, JAVA, Ruby, or other human-readable languages and then compiled, assembled, or otherwise transformed into machine code that can be loaded into read-only memory (ROM), erasable programmable read-only memory (EPROM), or other recordable memory that is coupled to the CPU or microcontroller and then then executed by the CPU or microcontroller. For convenience, the steps of the example method 400 are described as being performed by a cloud server. In some implementations, one or more steps described herein as being performed by the cloud server may be performed instead by another component described herein.

At block 402, the cloud server receives a login request from a user device, where the login request includes the user's login credentials. For example, the login request may be an HTTPS request. The user's login credentials may be the user's current PSK. In other cases, the cloud server credentials may differ from the Wi-Fi access credentials.

At block 404, the cloud server causes a password change user interface element to be displayed on the user device. The user interface presented on the user device may include the password change user interface element that, upon user activation, transmits another HTTPS request to the cloud server indicating that the user wishes to change her password.

At block 406, the cloud server receives a request to change the user's password, where the request includes an indication of the user-selected new password. For example, the user may select from two or more new password options generated by the cloud server. Alternatively or additionally, the user may be allowed to type in a custom password. Although not illustrated in FIG. 4, additional requests and responses may be communicated between the user device and the cloud server to further modify or confirm the new password. For example, FIGS. 14A-14Q discussed below illustrate the user interfaces that may be presented on the user device.

At block 408, the cloud server calls a password change API provided by a Wi-Fi controller configured to access the user's Wi-Fi access points. For example, the cloud server may include unique "zone" ID for each MDU property, the SSID associated with zone, and the VLAN ID associated with the user's VLAN. The Wi-Fi controller may identify, using the information provided by the cloud server, the specific password that needs to be updated or the specific location in the database to which the new password should be added. For example, the Wi-Fi controller may simply add an additional password for the user and leave the old password intact for the duration of the grace period.

At block 410, in response to a confirmation from the Wi-Fi controller, the cloud server causes a message to be displayed on the user device, where the message indicates that the password has been changed. The message may also indicate that the old password may be valid during a grace period (e.g., 1 hour, 2 hours, etc.) such that for the duration of the grace period, both the old password and the new password can be used to access the wireless services associated with the user (e.g., resident in an apartment unit). At the expiration of the grace period, the network device(s) connected to the wireless network using the old password may be disconnected (e.g., with a prompt letting the user know that the connection will terminate, or without such a prompt).

In the method 400, one or more of the blocks shown in FIG. 4 may be removed (e.g., not performed) and/or the order in which the method 400 is performed may be switched. In some implementations, additional blocks may be added to the method 400. The implementations of the present disclosure are not limited to or by the example shown in FIG. 4, and other variations may be implemented without departing from the spirit of this disclosure.

No Service

Figure 5:
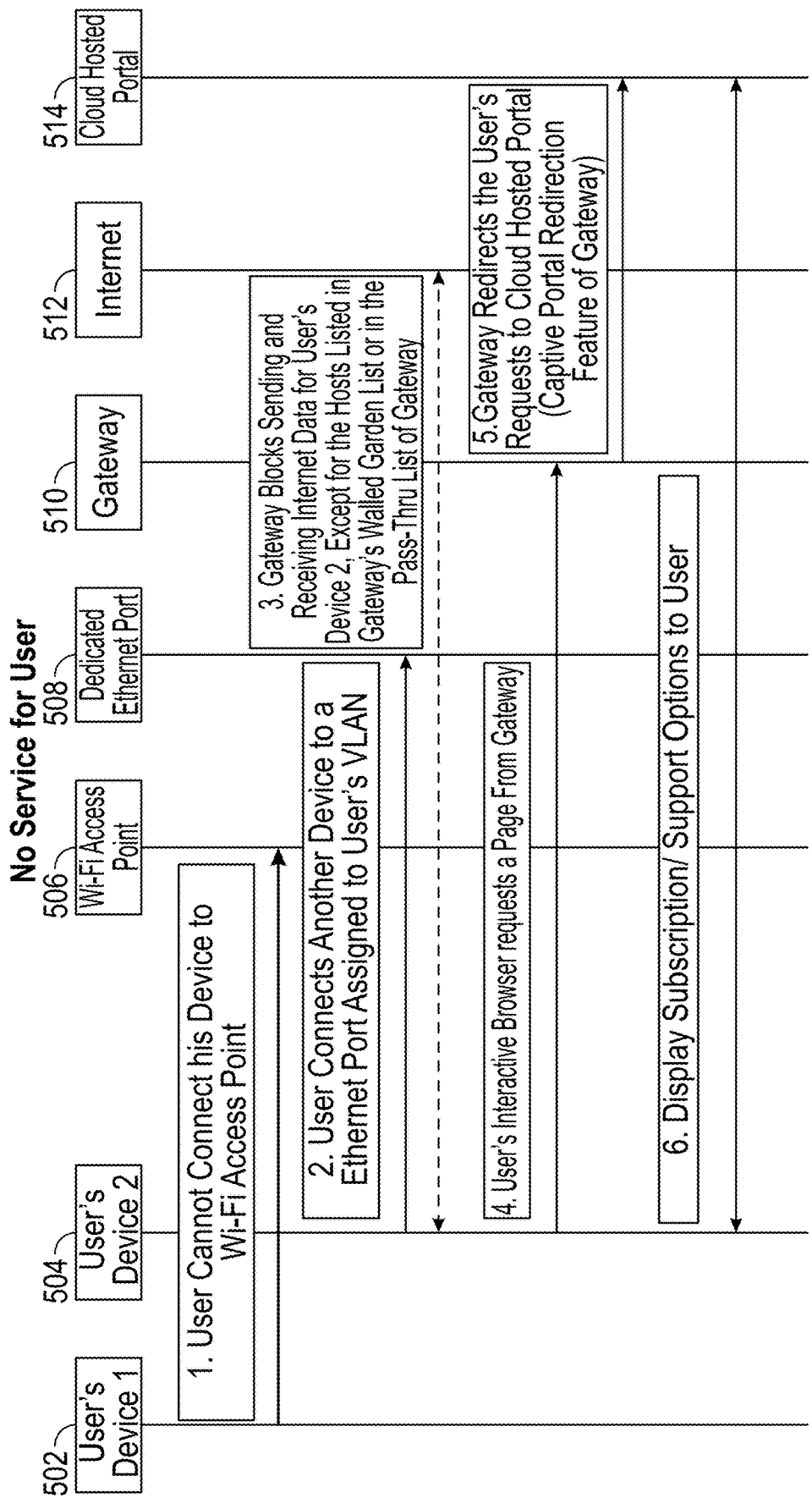
FIG. 5 illustrates a process flow in which a user device cannot access the wireless service in accordance with aspects of this disclosure.

FIG. 5 illustrates a process flow in which a user device cannot access the wireless service. As shown in FIG. 5, the user device is unable to connect to the Wi-Fi access point. The user then connects a second user device to the Ethernet port assigned to the user's VLAN. In response, the gateway device blocks sending and receiving Internet data for the second user device, except for the hosts listed in the gateway's walled garden list or in the pass-thru list of the gateway. The user requests, via the second user device's interactive browser, a page from the gateway. The gateway redirects the user's request to cloud-hosted portal (e.g., captive portal redirection feature of the gateway). The cloud-hosted portal causes the subscription/support options to be displayed on the second user device.

Adding Service

Figure 6:
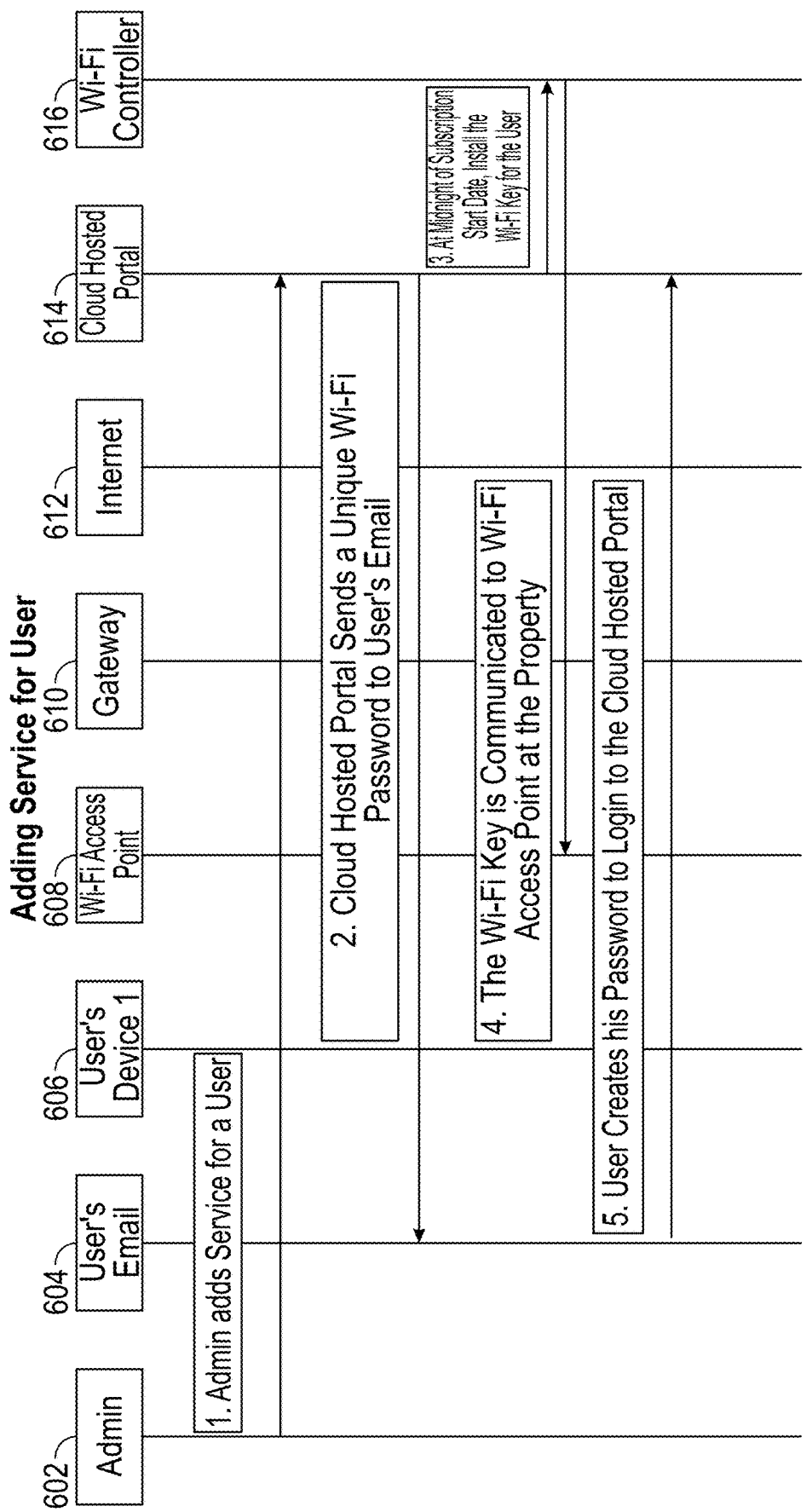
FIG. 6 illustrates a process flow in which a user device signs up the wireless service in accordance with aspects of this disclosure.

FIG. 6 illustrates a process flow in which a user device signs up the wireless service. As shown in FIG. 6, an admin adds the wireless service for a user, and in response, the cloud-hosted portal sends a unique Wi-Fi password to the user's email. At a given subscription start date (e.g., at midnight), the cloud-hosted portal installs the Wi-Fi key for the user. The Wi-Fi key is then communicated to the Wi-Fi access point(s) at the user's property. In some implementations, the key is not communicated to the Wi-Fi access point(s), and in response to a request from the user's device to gain Wi-Fi access, the Wi-Fi access point queries the Wi-Fi controller to determine whether the Wi-Fi PSK indicated by the user's device is valid for authentication. Using the Wi-Fi password, the user can login to the cloud-hosted portal.

Accepting Terms and Conditions

Figure 7:
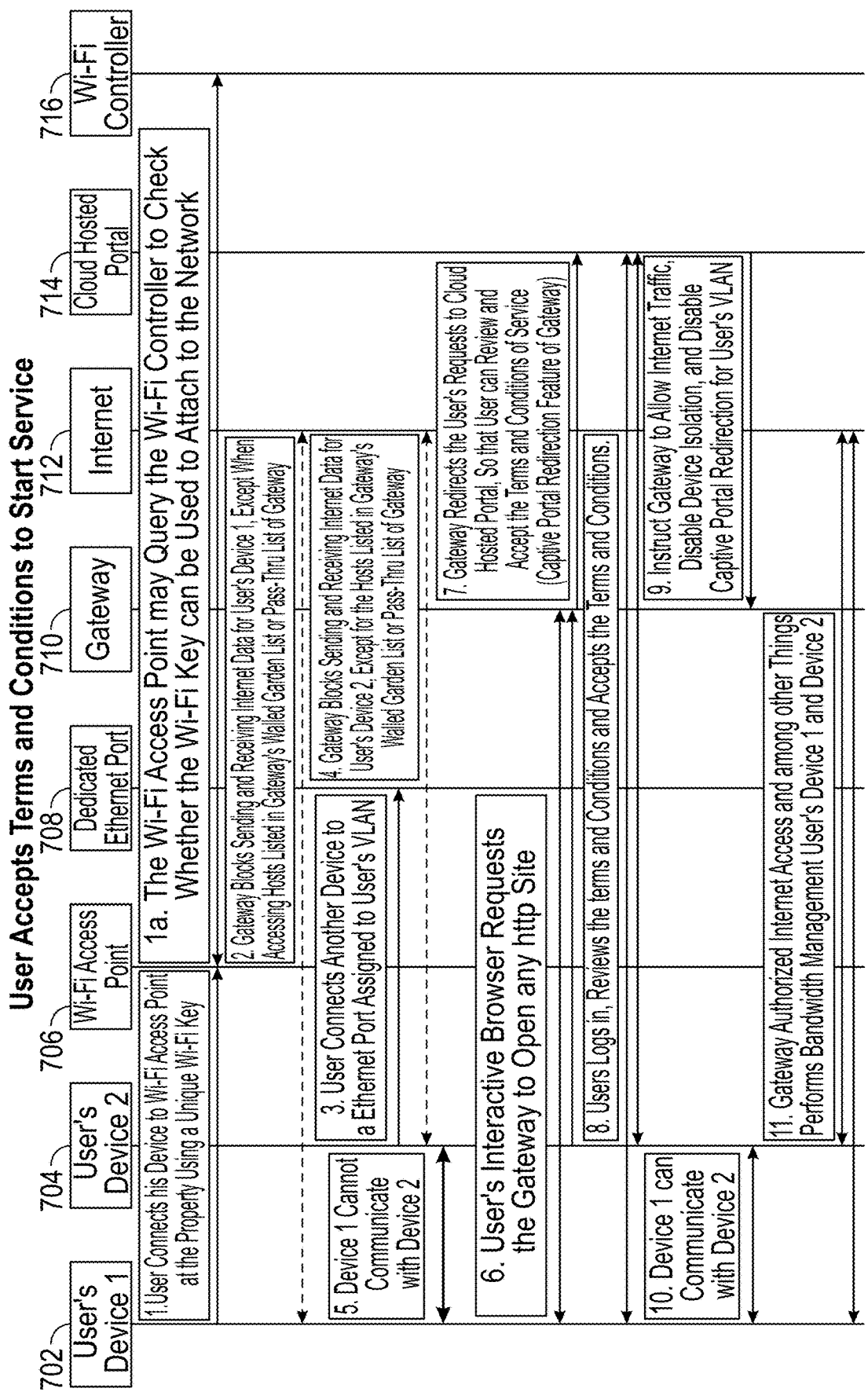
FIG. 7 illustrates a process flow in which the user accepts the terms and conditions of the wireless service in accordance with aspects of this disclosure.

FIG. 7 illustrates a process flow in which the user accepts the terms and conditions of the wireless service. As shown in FIG. 7, the user connects his device to the Wi-Fi access point at the property using a unique Wi-Fi key. As shown, the Wi-Fi access point may query the Wi-Fi controller to check whether the Wi-Fi key can be used to attach to the network. The gateway blocks sending and receiving Internet data for the user's device, except for the hosts listed in the gateway's walled garden list or pass-thru list of the gateway. The user connects a second user device to a Ethernet port assigned to the user's VLAN. The gateway blocks sending and receiving Internet data for second user device, except for the hosts listed in the gateway's walled garden list or pass-thru list of the gateway. The first user device cannot communicate with the second user device. The user's interactive browser requests the gateway to open an HTTP site. The gateway redirects the user's requests to the cloud-hosted portal, so that the user can review and accept the terms and conditions of service (e.g., captive portal redirection feature of gateway). The user logs in, reviews the terms and conditions, and accepts the terms and conditions. The cloud-hosted portal instructs the gateway to allow Internet traffic, disable device isolation, and disable captive portal redirection for the user's VLAN. The first user device can now communicate with the second user device (e.g., as part of the user's VLAN). The gateway allows sending and receiving Internet data for the first and second user devices.

Normal Service

Figure 8:
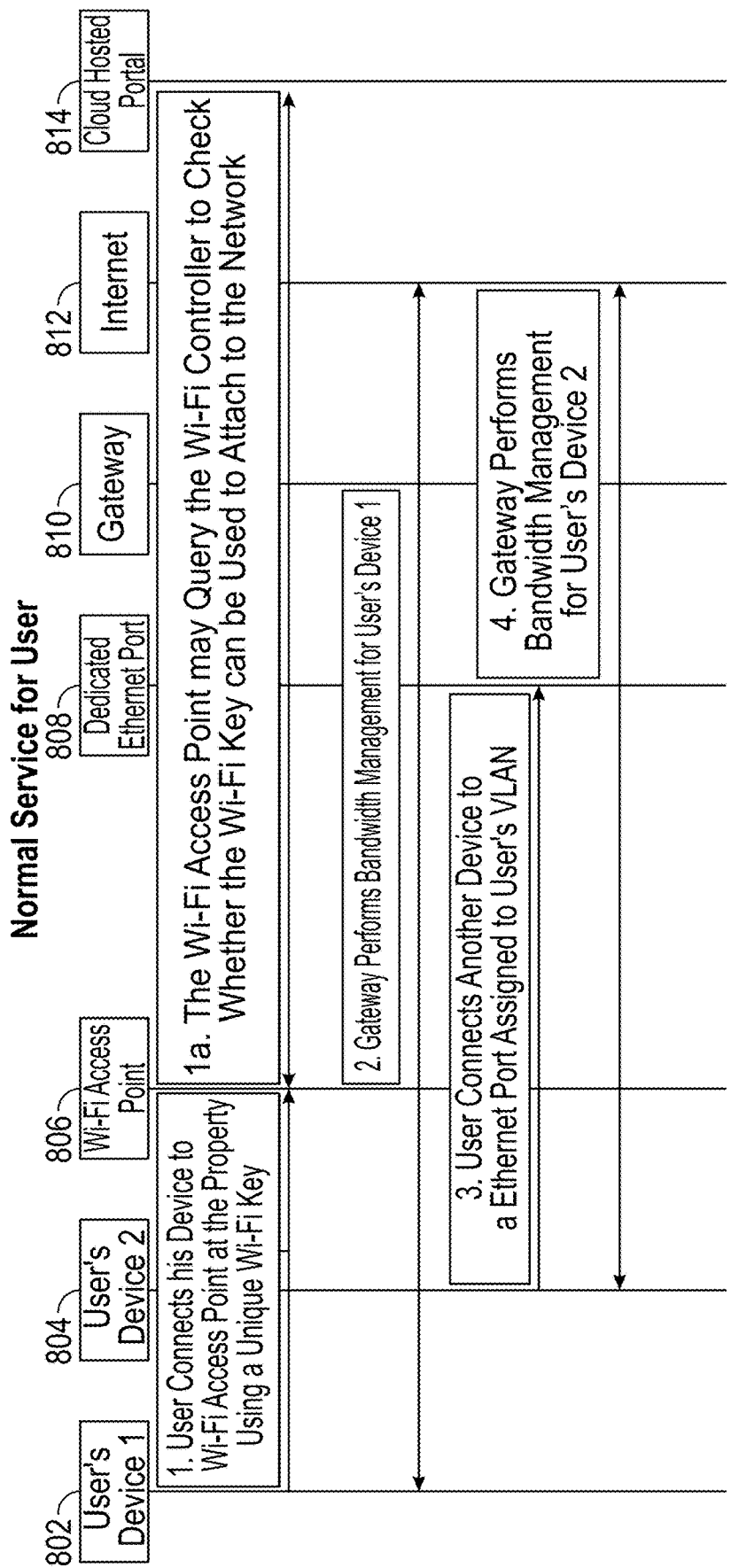
FIG. 8 illustrates a process flow in which the user uses the wireless service in accordance with aspects of this disclosure.

FIG. 8 illustrates a process flow in which the user uses the wireless service. As shown in FIG. 8, the user connects a first user device to the Wi-Fi access point at the property using a unique Wi-Fi key. As shown, the Wi-Fi access point may query the Wi-Fi controller to check whether the Wi-Fi key can be used to attach to the network. The gateway throttles sending and receiving Internet data for the first user device. The user connects a second user device to a Ethernet port assigned to the user's VLAN. The gateway throttles sending and receiving Internet data for the second user device.

Changing Wi-Fi Password

Figure 9:
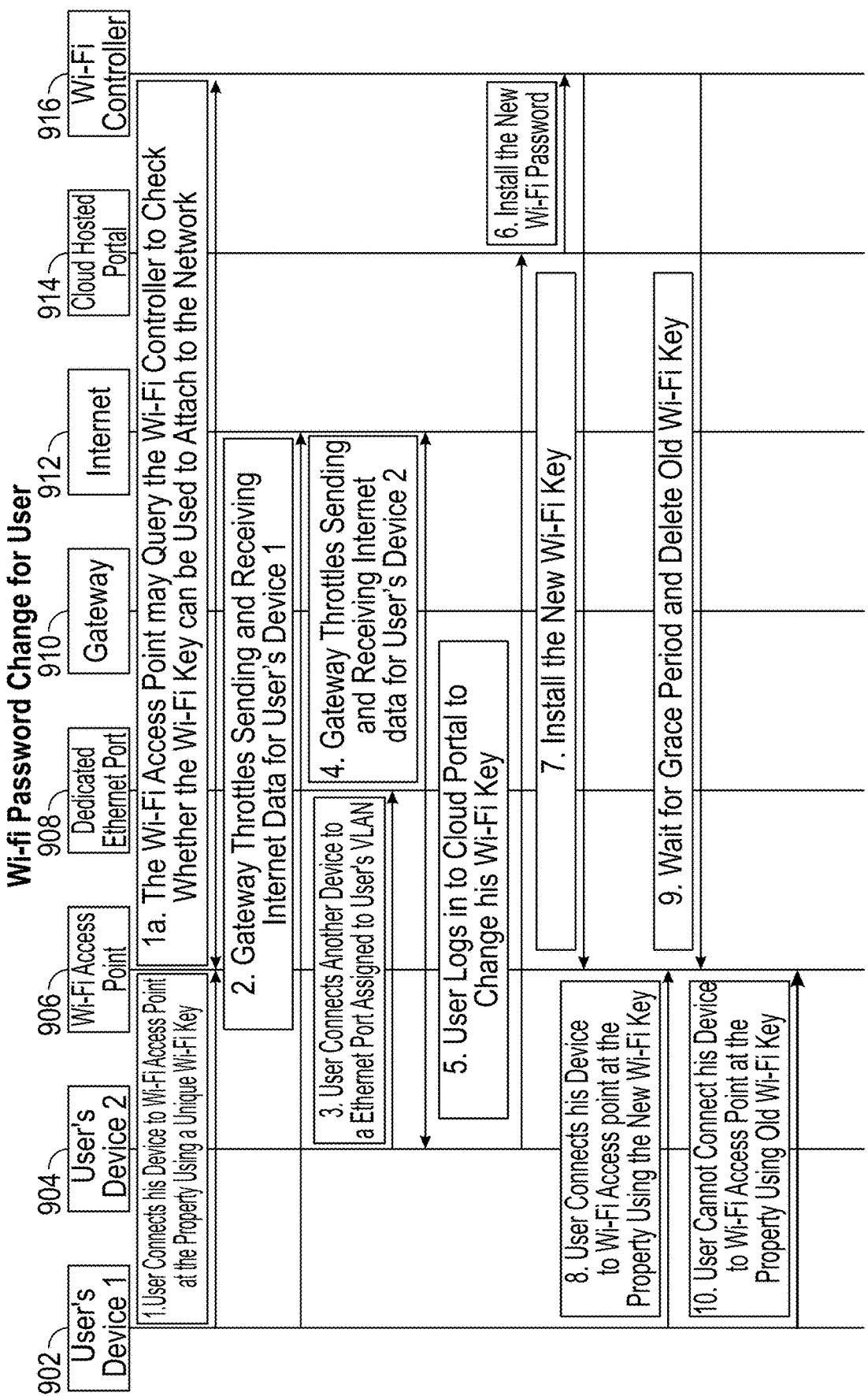
FIG. 9 illustrates a process flow in which the user changes his password for the wireless service in accordance with aspects of this disclosure.

FIG. 9 illustrates a process flow in which the user changes his password for the wireless service. As shown in FIG. 9, the user connects a first user device to the Wi-Fi access point at the property using a unique Wi-Fi key. As shown, the Wi-Fi access point may query the Wi-Fi controller to check whether the Wi-Fi key can be used to attach to the network. The gateway throttles sending and receiving Internet data for the first user device. The user connects a second user device to a Ethernet port assigned to the user's VLAN. The gateway throttles sending and receiving Internet data for the second user device. The user logs in to the cloud-hosted portal to change his Wi-Fi key. The cloud-hosted portal installs the new Wi-Fi password at the Wi-Fi controller. The Wi-Fi controller installs the new Wi-Fi key at the Wi-Fi access points. The user connects the first user device to the Wi-Fi access point at the property using the new Wi-Fi key. The Wi-Fi controller removes the old password after the grace period. The user cannot connect his devices to Wi-Fi access point at the property using old Wi-Fi key.

Updating Terms and Conditions

Figure 10:
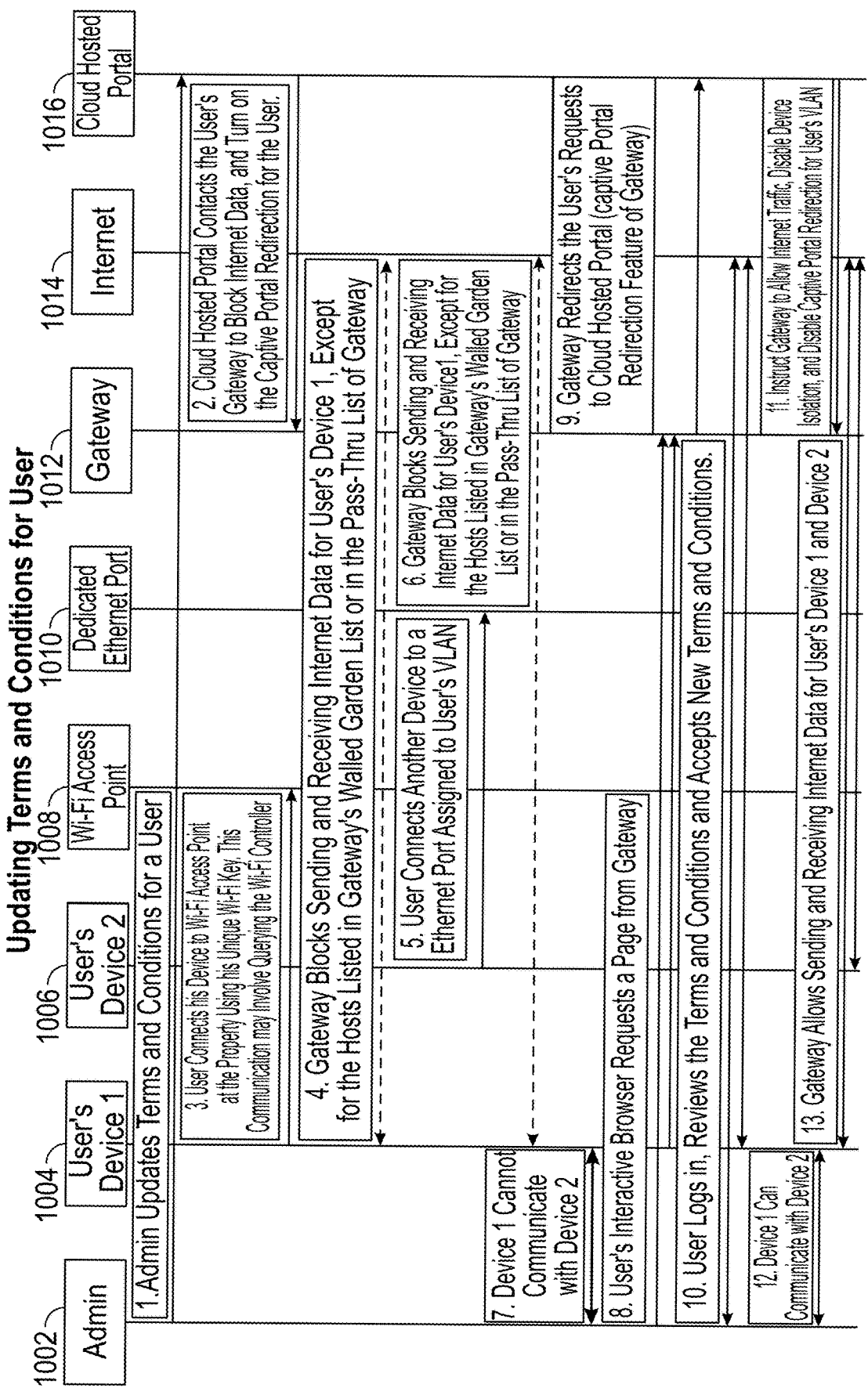
FIG. 10 illustrates a process flow in which the terms and conditions for the wireless service is updated in accordance with aspects of this disclosure.

FIG. 10 illustrates a process flow in which the terms and conditions for the wireless service is updated. As shown in FIG. 10, the admin updates the terms and conditions for a user. The cloud-hosted portal contacts the user's gateway to block Internet data, and turn on the captive portal redirection for the user. The user connects a first user device to Wi-Fi access point at the property using his unique Wi-Fi key. For example, this process may involve the Wi-Fi access point querying the Wi-Fi controller (e.g., to check whether the Wi-Fi key can be used to attach to the network). The gateway blocks sending and receiving Internet data for the first user device, except for the hosts listed in the gateway's walled garden list or in the pass-thru list of the gateway. The user connects a second user device to a Ethernet port assigned to the user's VLAN. The gateway blocks sending and receiving Internet data for the second user device, except for the hosts listed in the gateway's walled garden list or in the pass-thru list of the gateway. The first user device cannot communicate with the second user device. The user's interactive browser requests a page from the gateway. The gateway redirects the user's requests to the cloud-hosted portal (e.g., captive portal redirection feature of gateway). The user logs in, reviews the terms and conditions, and accepts new terms and conditions. The cloud-hosted portal instructs the gateway to allow Internet traffic, disable device isolation, and disable captive portal redirection for the user's VLAN. The first user device can communicate with the second user device. The gateway allows sending and receiving Internet data for the first and second user devices.

Terminating Service

Figure 11:
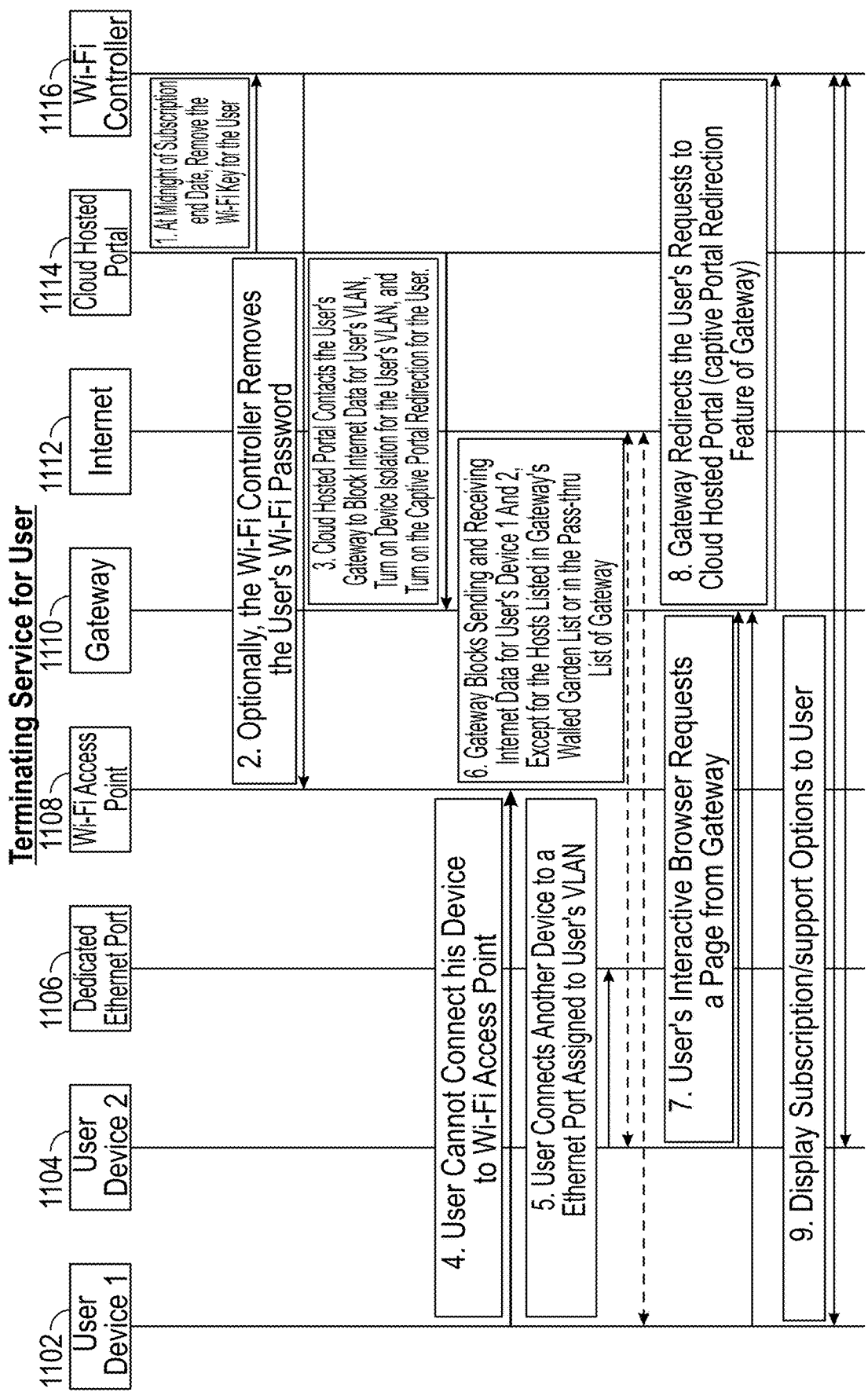
FIG. 11 illustrates a process flow in which the wireless service is terminated in accordance with aspects of this disclosure.

FIG. 11 illustrates a process flow in which the wireless service is terminated. As shown in FIG. 11, on the subscription end date (e.g., at midnight), the cloud-hosted portal removes the Wi-Fi key for the user at the Wi-Fi controller. Optionally, the Wi-Fi controller removes the user's Wi-Fi password at the Wi-Fi access points. The cloud-hosted portal contacts the user's gateway to block Internet data for user's VLAN, turn on device isolation for the user's VLAN, and turn on the captive portal redirection for the user. The user cannot connect the user's device to Wi-Fi access point. The user connects a second user device to a Ethernet port assigned to the user's VLAN. The gateway blocks sending and receiving Internet data for the first and second user devices, except for the hosts listed in the gateway's walled garden list or in the pass-thru list of the gateway. The user's interactive browser requests a page from the gateway. The gateway redirects the user's requests to the cloud-hosted portal (e.g., captive portal redirection feature of gateway). The cloud-hosted portal causes subscription/support options to be displayed on one or both of the user devices. Although not specifically illustrated, the requests and responses illustrated in FIGS. 5-11 may utilize the HTTPS protocol (or another suitable protocol for communicating the described information).

Pre-Shared Key Management

A wireless network can cover multiple units of an MDU property. In some cases, using a single SSID is preferred to avoid residents from having to choose from a long list of SSIDs. Such a network comprises multiple wireless Access Points, a wireless controller, network switches, and one or more wireless access point controllers. The controller coordinates radius frequencies among the AP to optimize coverage and reduce interference between Access Points and devices in adjacent units.

A wireless network can be deployed using multiple SSIDs such as a unique SSID for each apartment. For example, one SSID per apartment. In such a case, it is possible to configure a unique WPA2-Personal Pre-Shared Key. However, due to the high density of apartments each resident is exposed to a high number of SSIDs; thus, making it difficult to choose the SSIDs for their apartment because there could be hundreds of SSIDs displayed to the resident. This problem is typically called a Wi-Fi soup. A typical device can display perhaps 10 to 30 SSIDs whereas there could be 500 or more apartments on a single MDU property.

Additionally, a resident wishes to roam around the property while still being connected to the private in-room network. Most in-home IoT devices are quite basic and only support WPA2-Personal encryption. Using the personal Wi-Fi WPA2 key, a unique Personal Area Network is created for each user, allowing residents to securely connect to their home network from anywhere on the property. Residents can control their connected IoT and media devices at home, while they are at a neighbor's house or in the common area. This may include IoT devices, such as thermostats and lighting, and media streaming devices like Apple TV and Chromecast.

In some implementations, Pre-Shared Keys are managed by, and stored in, the wireless controller described herein (also referred to herein as Wi-Fi controller). In some implementations, the wireless controller may be limited to storing and managing only a fixed number of unique keys per SSID (e.g., 500 unique keys per SSID in a single "zone" or single MDU property). In some of such implementations, the wireless controller may be configured to authenticate a supplicant (e.g., laptop, smartphone, IoT device, and the like) without accessing the Internet or a cloud server.

In some implementations, the management and storage of Pre-Shared Keys can be performed by a wireless PSK manager (also referred to herein as Wi-Fi PSK manager) instead of the wireless controller described herein. In some of such implementations, the wireless PSK manager may be configured to access a cloud server (e.g., over the Internet) to authenticate a supplicant. In such implementations, some or all of the management and/or storage may be performed by the cloud server. In other implementations, the wireless PSK manager may be configured to authenticate the supplicant without accessing the Internet or a cloud server.

Wi-Fi Signal Frequency Management

As described above, the frequencies of the Wi-Fi signals can be coordinated such that interference among residents' Wi-Fi signals can be reduced or minimized. In some implementations, the Wi-Fi controller gathers the radio frequency monitoring data from Wi-Fi access points at regular intervals and, if required, instructs the Wi-Fi access point to use a different frequency (or range of frequencies) for connecting to a Wi-Fi device (e.g., user equipment). The frequencies may be determined by government agencies (e.g., FCC in US), and the Wi-Fi controller can fine-tune the frequencies based on the density of devices and other environmental factors. The frequency ranges may include, for example, 2400-2500 MHz (commonly called "2.4 GHz") and/or 5725-2875 MHz (commonly called "5 GHz" or "5.8 GHz").

The frequencies may be grouped into channels. Each channel may include a single frequency or a range of frequencies. When two adjacent access points use the same channel, they may interfere with each other (e.g., such as when two groups of people are holding multiple conversation at the same time in the same room). Thus, the Wi-Fi controller may coordinate the usage of the channels to minimize or reduce the usage of the same channel by adjacent access points. This can be done by rotating the channels used by the access points and also by adjusting the power levels.

Virtual Personal Area Network

As described above, the residents at an MDU property may securely connect to their home network from anywhere on the property. In some implementations, using the personal Wi-Fi WPA2 key, a unique private network is created for each user, and the devices that connect to the Wi-Fi network using the same key, regardless of the locations the individual devices connect from or the access points the individual devices connect to, are added to the private network (e.g., virtual personal area network [VPAN], or a virtual local area network [VLAN]). For example, a special tag (e.g., VLAN ID tag) is added to all packets associated with these devices. To do so, when the Wi-Fi controller authenticates a device using a PSK, the Wi-Fi controller may provide the VLAN ID associated with the PSK to the access point in order to direct the access point to tag all traffic generated by the device with the provided VLAN ID. Using the VLAN ID tags, the access points and/or the switches in the network environment may allow devices that are part of the same private network (e.g., having the same VLAN ID tag) to directly communicate with each other and prevent devices that are part of different private networks (e.g., having different VLAN ID tags) from directly communicating with each other.

In some implementations, the resident's personal PSK is associated with one VLAN, and the resident's guest PSK is associated with another VLAN, such that devices using the resident's personal PSK are connected to one VLAN, and the devices using the resident's guest PSK are connected to another VLAN. In other implementations, the resident's personal PSK and the resident's guest PSK are both associated with the same VLAN, such that devices using the resident's personal PSK and the devices using the resident's guest PSK are all connected to the same VLAN. In yet other implementations, the resident's personal PSK is associated with one VLAN, and the resident's guest PSK is not associated with any VLAN, such that while the devices using the resident's personal PSK are connected to the same VLAN, the devices using the resident's guest PSK are not connected to a VLAN or are each connected to a separate VLAN not associated with any other device. In some implementations, the resident can specify which one of these VLAN options should be applied.

WPA2 4-Way Handshake

Figure 12:
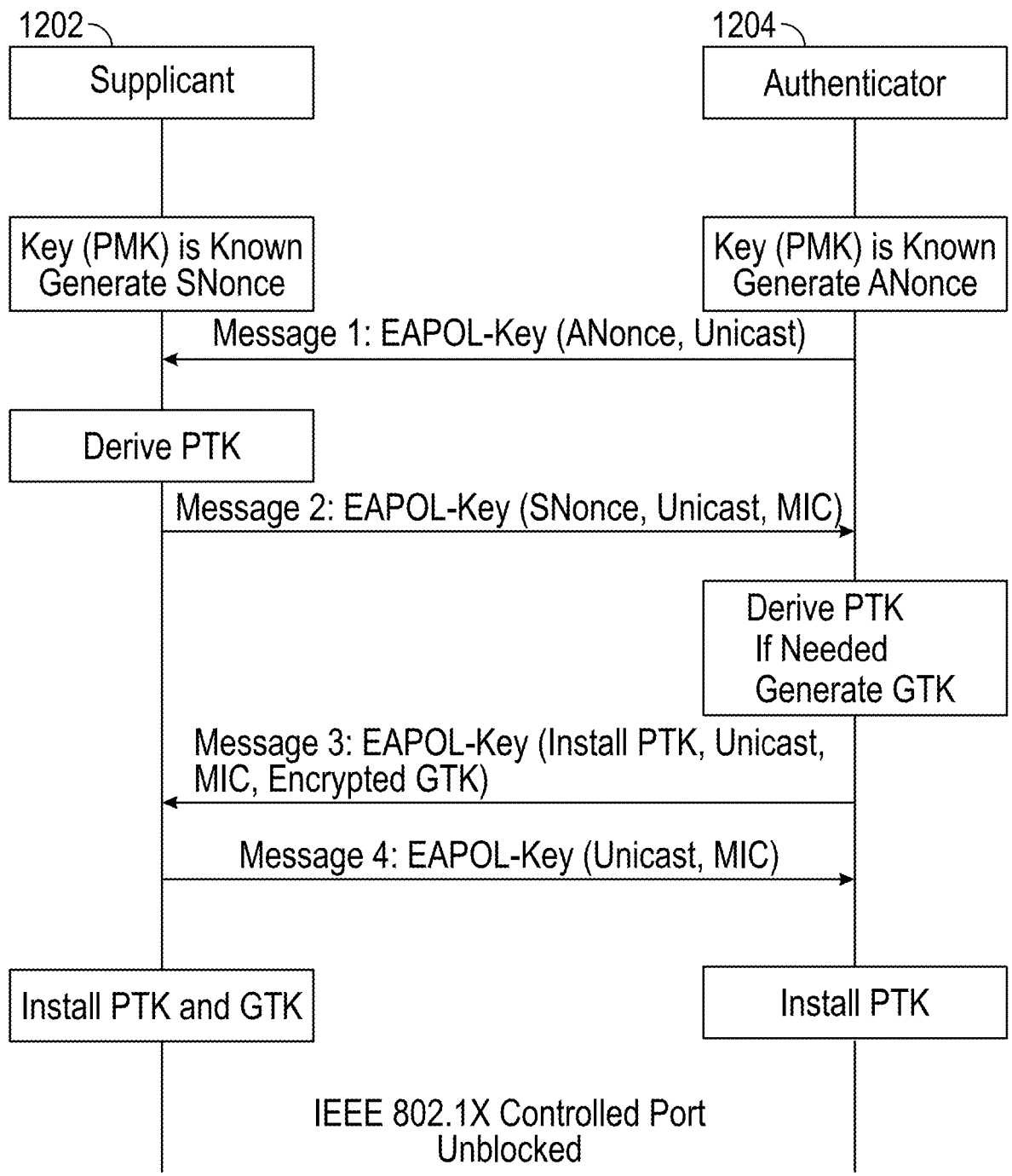
FIG. 12 illustrates an example process flow for performing a WPA2 handshake process in accordance with aspects of this disclosure.

For MDU properties having a large number of units (e.g., over 500 apartments), an improved authentication method that does not place a limit on the number of Pre-Shared Keys that can be stored or managed. For example, the Pre-Shared keys may be stored and/or managed on a server external to the Wi-Fi controller described herein. With reference to FIG. 12, an example process of performing a WPA2 four-way handshake, as specified by IEEE 802.11i-2004, is described.

FIG. 12 shows the exchange of messages between the supplicant (e.g., client/user device such as laptop, smartphone, IoT device, and the like) and the authenticator (e.g., the access point described herein). One or more of the functions, parameters, and acronyms may be specified in IEEE 802.11i-2004, which is incorporated herein by reference in its entirety.

In FIG. 12, PMK may be calculated using the following formula: PMK=PBKDF2(PSK, SSID, SSID_LENGTH, 4096, 256). In some implementations, PBKDF2 may take the following input parameters: PBKDF2(A, B, C, iter, len), where A is a pseudorandom function of two parameters with output length hLen (e.g., a keyed HMAC), B is the master password from which a derived key is generated, C is a sequence of bits, known as a cryptographic salt, iter is the number of iterations desired, and len is the desired bit-length of the derived key.

PTK may be generated using the following formula (e.g., see IEEE 802.11i-2004 section 8.5.1.2), where || denotes concatenation: PTK=PRF(PMK, "Pairwise key expansion", Min(AA,SPA)||Max(AA,SPA)||Min(ANonce,SNonce)||Max(ANonce,SNonce)).

Key Confirmation Key (KCK) may be the first 128 bits of the PTK. The KCK can be derived as follows: KCK=L(PTK, 0, 128).

WPA Message Integrity Code (WPA-MIC) can be derived as: WPA-MIC=HMAC(hash=SHA1, key=KCK, data=EAPOL header (MIC cleared)).

WPA2 4-Way Handshake Using a Wi-Fi PSK Manager

Figure 13:
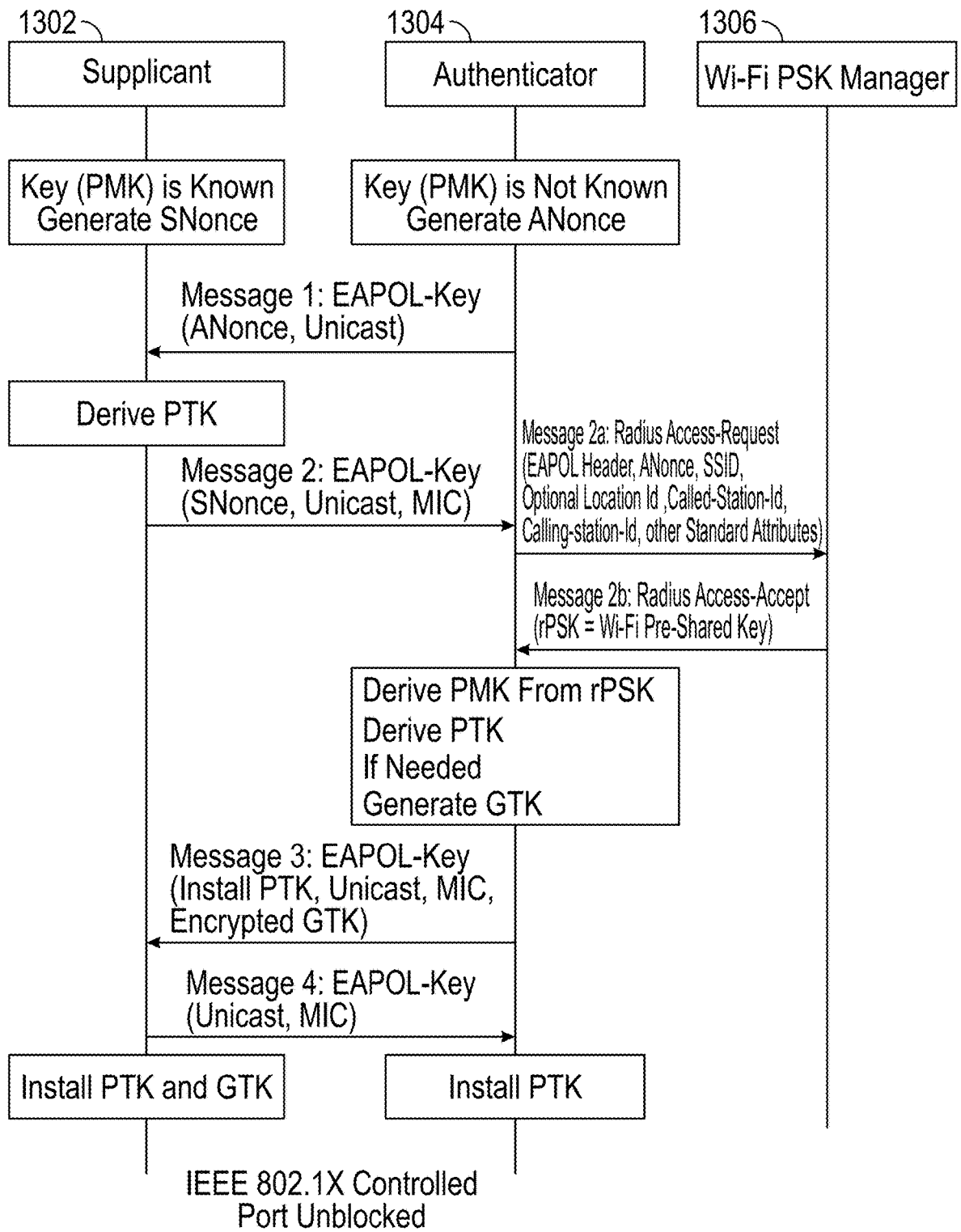
FIG. 13 illustrates another example process flow for performing a WPA2 handshake process in accordance with aspects of this disclosure.

FIG. 13 shows the exchange of messages between the supplicant (e.g., client/user device such as laptop, smartphone, IoT device, and the like) and the authenticator (e.g., the access point described herein). In the example of FIG. 13, the PMK is not known by the authenticator.

In addition to the messages illustrated in FIG. 12, the example of FIG. 13 includes Messages 2a and 2b. Message 2a is a RADIUS (Remote Authentication Dial-In User Service) access request from the authenticator to the Wi-Fi PSK manager. The RADIUS access request may include access credentials (e.g., a key provided by the supplicant or information derived from such a key, or message integrity code/signature). Additionally, the RADIUS access request may contain other information which the Wi-Fi PSK manager knows about the user, such as its network address or phone number, and information regarding the user's physical point of attachment to the Wi-Fi PSK manager. In such cases, the Wi-Fi controller described herein may not need to store the keys for each user or resident, and may be able to submit a request to the Wi-Fi PSK manager to authenticate users. The Wi-Fi PSK manager may be implemented in the cloud (e.g., using a pool of network-accessible computing resources provided by a cloud provider), on site (e.g., at the MDU property), or in an off-site location. In some implementations, the Wi-Fi PSK manager may have access to (or maintain) the information described herein as being accessed or maintained by the Wi-Fi controller (e.g., database of keys, VLAN IDs, user information, etc.). In some of such implementations, the Wi-Fi controller does not directly access or manage the information accessed/managed by the Wi-Fi PSK manager.

The Wi-Fi PSK manager may go through the keys stored/managed by the Wi-Fi PSK manager (e.g., thousands or tens of thousands of keys), compute the message authentication code, and if they match, Wi-Fi PSK manager determines which key has been used the supplicant, and the Wi-Fi PSK manager can further determine that the resident associated with the key, because key is mapped to other information like VLAN, etc.

Message 2b is a RADIUS access-accept response from the Wi-Fi PSK manager to the authenticator. The access-accept response can contain any standard authorization attributes including Vendor-Specific Attributes and/or VLAN ID (which can be used to configure the access points to tag the packets associated with the device requesting access with the VLAN ID tag), bandwidth parameters, and the like. So in additional to specifying the determined key to the authenticator, the Wi-Fi PSK manager can instruct the authenticator to put the supplicant on a particular VLAN (e.g., based on the Wi-Fi PSK manager's determination of a mapping between the key and the VLAN to be used for the supplicant). For example, an attribute carrying an 802.1q or 802.1ad ID can be included to create a personal area network for the resident. In this case, all devices sharing a Pre-Shared Key can communicate with one another but at the same time be isolated from devices belonging to other residents. Other attributes can specify bandwidth management, quality of service parameters, parental control policies and so forth.

In some implementations, the Wi-Fi PSK manager can be configured to perform any one or more of the operations described herein as being performed by the wireless controller. In other implementations, the Wi-Fi PSK manager can be configured to perform any one or more of the operations described herein as being performed by the wireless controller in conjunction with the wireless controller. For example, the Wi-Fi PSK manager may store and/or manage a greater number of keys than the wireless controller described herein. As another example, the Wi-Fi PSK manager does not maintain a limit on the number of keys to be stored and/or managed by the Wi-Fi PSK manager (e.g., per-zone or per-MDU limit).

In the example of FIG. 13, Resident-MIC is extracted from EAPOL header included in Message 2a (Access-Request), then a location is selected. For each PSK (e.g., called cPSK) configured for the location, the following parameters are determined (c stands for "candidate"):

```
cPMK = PBKDF2(cPSK, SSID, SSID_LENGTH, 4096, 256)
cPTK = PRF(cPMK, "Pairwise key expansion", Min(AA,SPA) || Max(AA,SPA) ||
Min(ANonce,SNonce) || Max(ANonce,SNonce))
cKCK = L(cPTK, 0, 128)
cMIC = HMAC(SHA1, key=cKCK, data=EAPOL header (MIC cleared))
If Resident-MIC == cMIC
    // We found a match. Candiate PSK is Resdient' s PSK. Thus, return it
    Resident-PSK = cPSK
    Return
```

In the example above, the location could be a venue, an MDU property or even a service provider. Some of the acronyms used herein can refer to the following:

MIC: Message integrity code is calculated using SHA1 hash for WPA2 and MD5 for earlier WPA1 algorithm.
HMAC: Hashed message authentication code
AA: Authenticator MAC address SPA: Supplicant MAC address
PMK: Pairwise Master Key
PTK: Pairwise Transient Key
ANonce: 32 digit random value generated by the authenticator
SNonce: 32 digit random value generated by the supplicant
PSK: Pre-Shared Key
PBKDF2: Password-Based Key Derivation Function 2
PRF: Pseudo random function
MAC: Media Access Control Address
A-MAC: authenticator MAC address
S-MAC UI Element to Toggle Between Multiple Different Configuration Panels for a Single SSID In some implementations, the cloud-hosted portal causes a UI element to be presented on the user device, where the UI element is configured to toggle between multiple (e.g., two, three, or more) different configuration panels for a single SSID. In some implementations, the cloud-hosted portal causes a UI element to be presented on the user device, where the UI element is configured to toggle between multiple (e.g., two, three, or more) different QR codes for a single SSID.

Grace Period for Old Passwords

In some implementations, as described in FIG. 4, after a password (e.g., PSK) is changed, the old password is still valid for a grace period (e.g., 2 hours). In some cases, only resident passwords are given the grace period. In other cases, both resident passwords and guest passwords are given the grace period. In yet other cases, the resident passwords are given a grace period that is of a different length than that given to the guest passwords. In some implementations, without the grace period, the devices connected using the old password is dropped immediately. In other implementations, without the grace period, the devices connected using the old password is dropped after a period of time shorter than the grace period (e.g., 1 hour, or 2 hours).

Multi-Unit and Multi-Property SSID Settings Management Dashboard

In some implementations, the cloud-hosted portal causes a user interface to be presented on a user device (e.g., for an administrator user at the leasing office), a multi-unit SSID settings management dashboard. In some implementations, the cloud-hosted portal causes a user interface to be presented on a user device (e.g., for an administrator user at the corporate office), a multi-property Wi-Fi management dashboard.

Multiple Single-SSID Wireless Networks

Although some implementations are described herein in the single-SSID wireless network context, in other implementations, a single MDU property can have multiple single-SSID wireless networks, where each single-SSID wireless network is accessible by a subset (or all) of the residents at the MDU property. For example, each single-SSID wireless network may be associated with one or more buildings, towers, and/or regions within the MDU property.

In some implementations, residents may have access to one single-SSID wireless network of the MDU property, and the guests of the residents may have access to another single-SSID wireless network of the MDU property. In some implementations, each resident can create a guest VLAN for their own guests, but one resident's guest's network would be separate from another resident's guest's network.

VLAN Management

In some implementations, the property manager at an MDU property may configure, via the cloud server (also referred to as cloud portal) described herein, a database of unit numbers and VLAN IDs for the MDU property. The database may list all the units and associated VLAN IDs for the units. When a prospective resident signs the lease to a unit, the property manager may communicate that information (e.g., including the service start date and/or end date of that resident and the unit) to the cloud server, and the cloud server may generate a Wi-Fi key for the prospective resident. On the service start date, the generated Wi-Fi key (along with the unit number and the associated VLAN ID) is communicated to the Wi-Fi controller, which may share the information with the access points on the MDU property so that any communication using the Wi-Fi key can be tagged with the corresponding VLAN ID.

When the resident moves out, this information is communicated by the property manager to the cloud server, and the cloud server can remove the Wi-Fi key belonging to the resident who moved out from the database and communicate to the Wi-Fi controller that the Wi-Fi key should no longer be used. When a new resident moves into the same unit, the database entry having the unit number and the VLAN ID will be populated with a new Wi-Fi key associated with the new resident, so that communication using the new Wi-Fi key can be properly tagged with the correct VLAN ID.

The service tiers of the residents can be controlled using the VLAN ID. For example, the cloud server can communicate the service tier information (e.g., a table associating VLAN IDs with corresponding service tiers or bandwidth levels) to the on-site gateways, and the gateways can limit the bandwidth accordingly based on that information based on the VLAN ID with which the incoming and outgoing traffic is tagged.

Example User Interfaces (for Residents)

Figure 14B:
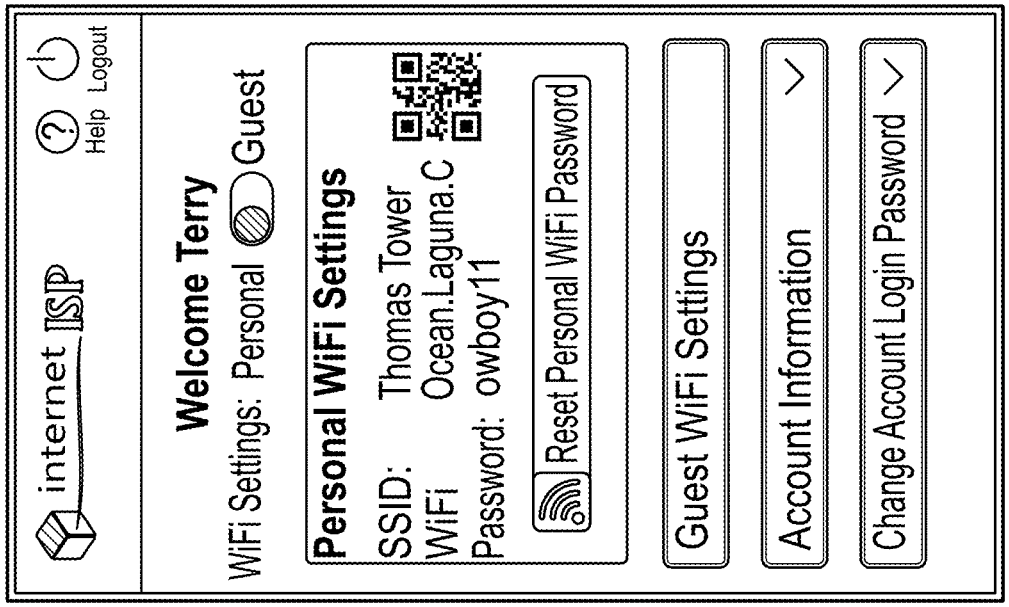
FIGS. 14A-14Q illustrate example user interfaces usable by a resident of an MDU property to set/reset personal and guest passwords in accordance with aspects of this disclosure.
Figure 14A:
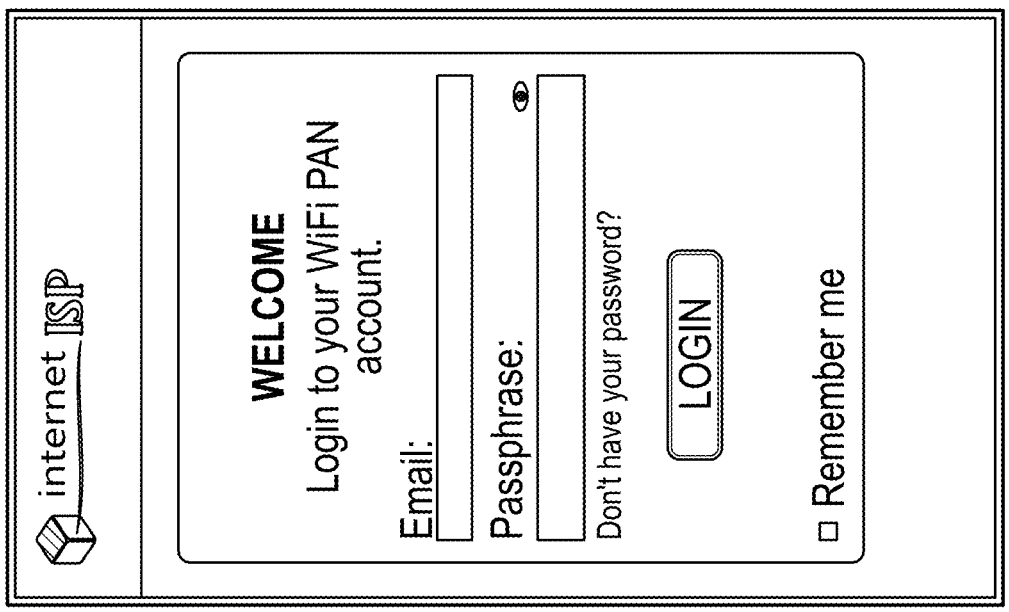
Figure 14D:
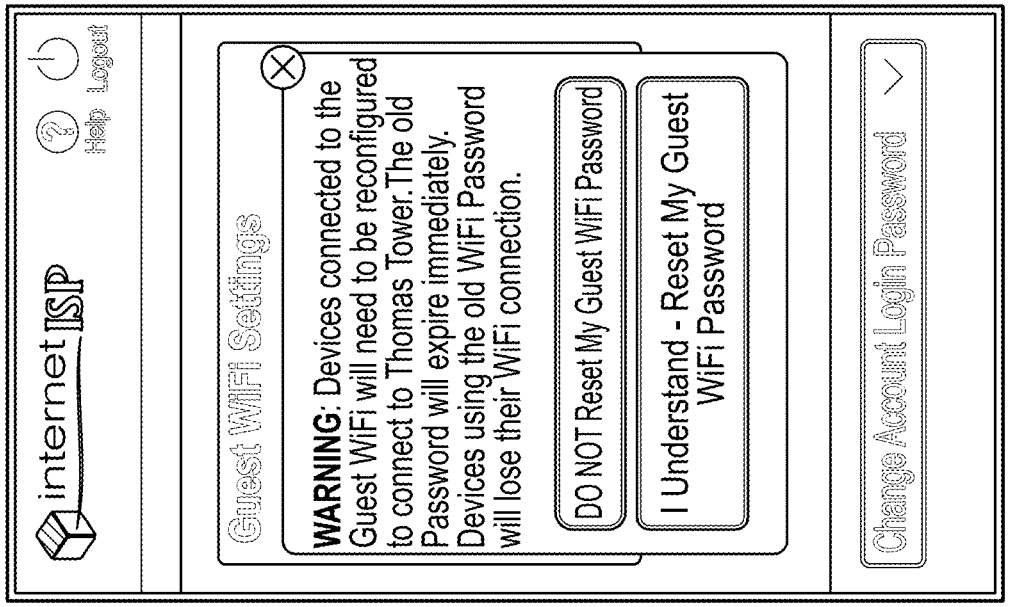
Figure 14C:
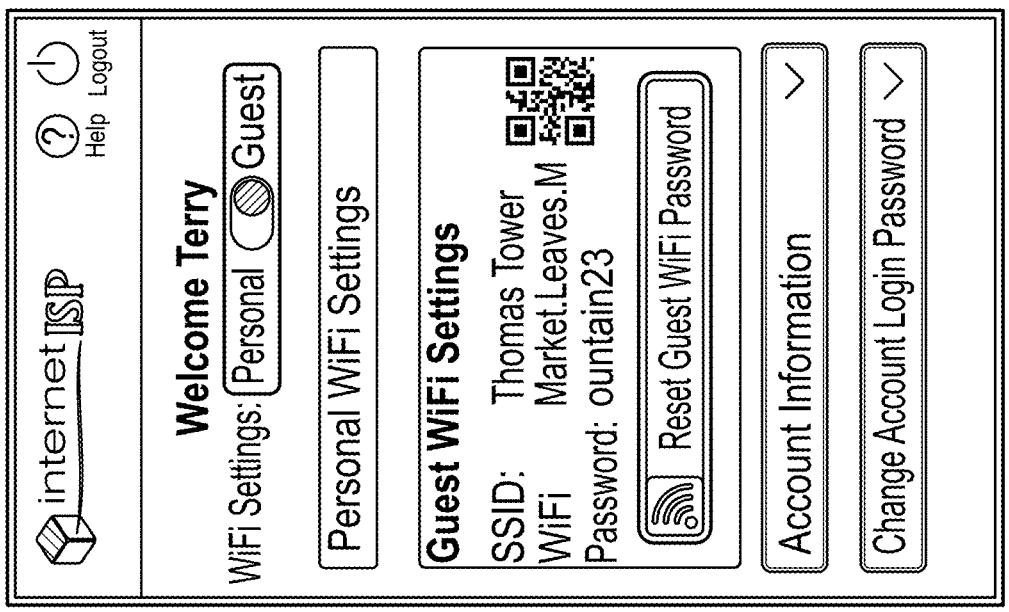
Figure 14F:
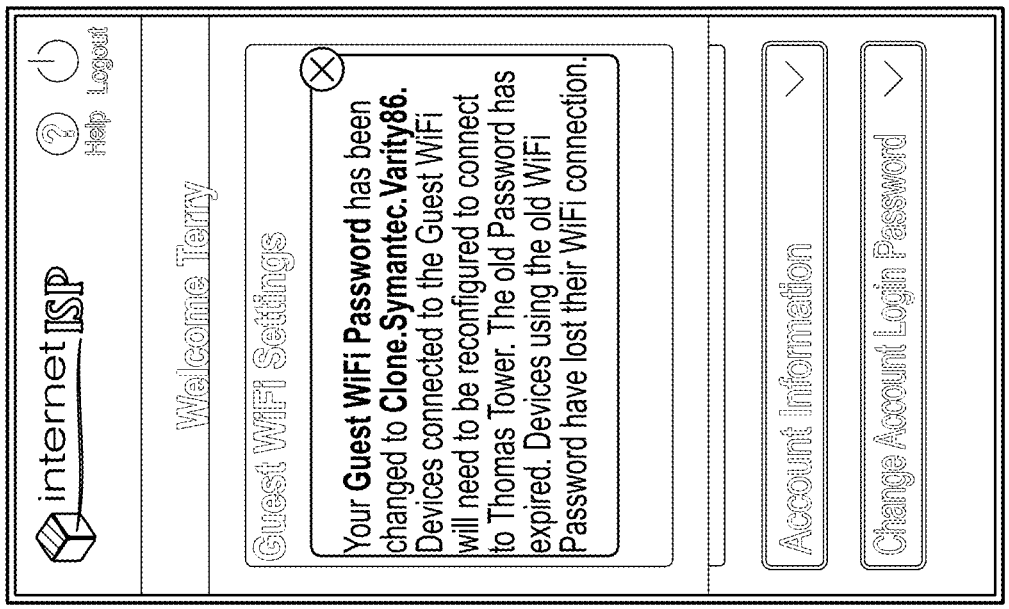
Figure 14E:
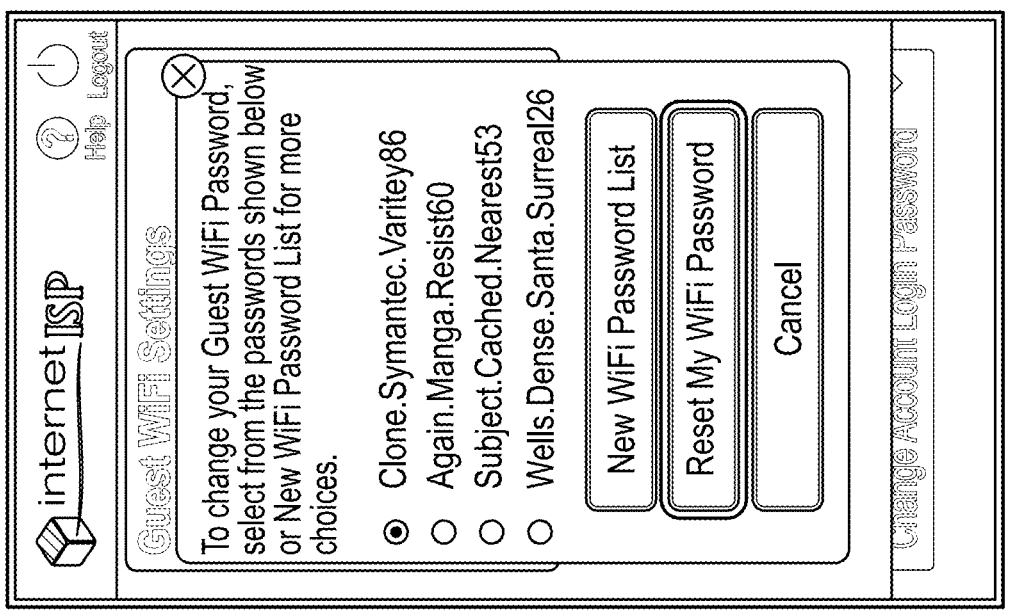
Figure 14I:
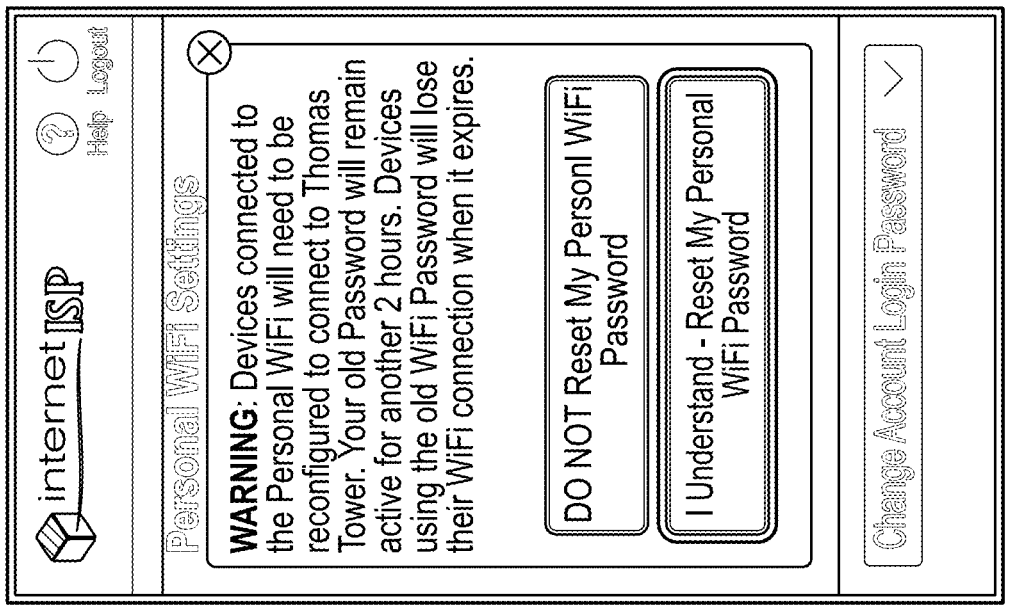
Figure 14H:
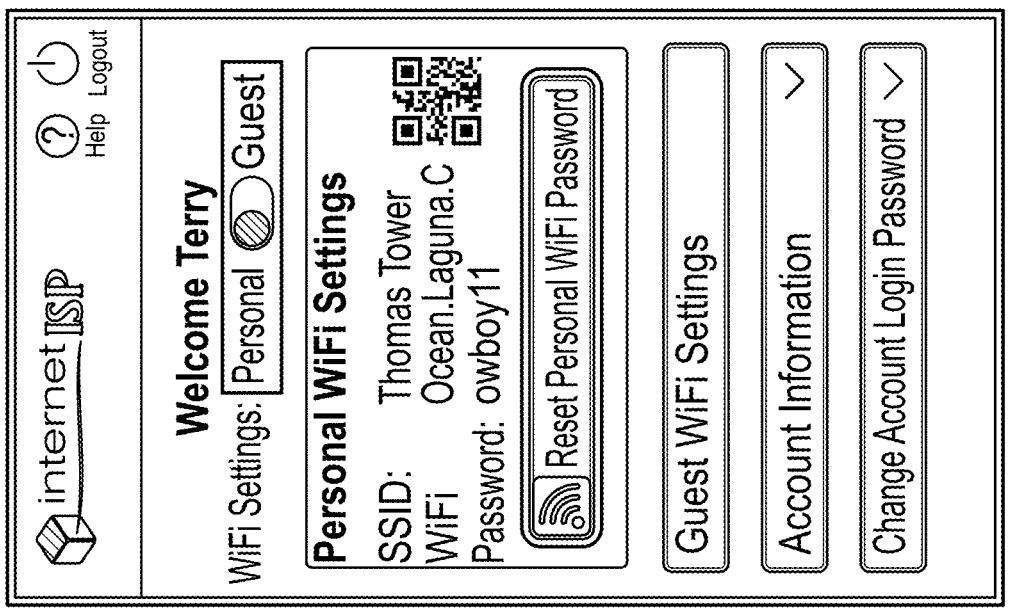
Figure 14K:
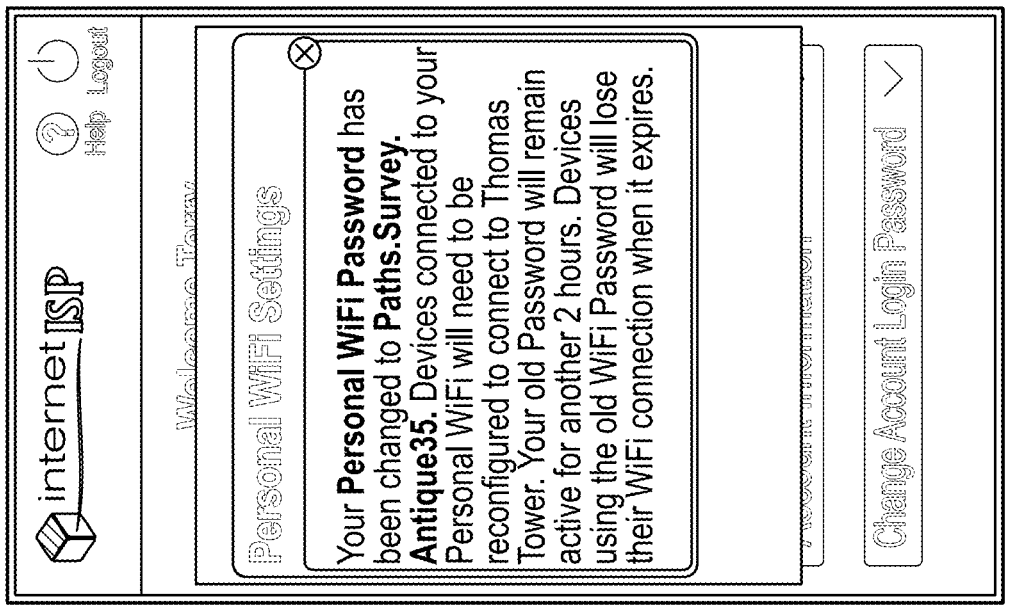
Figure 14J:
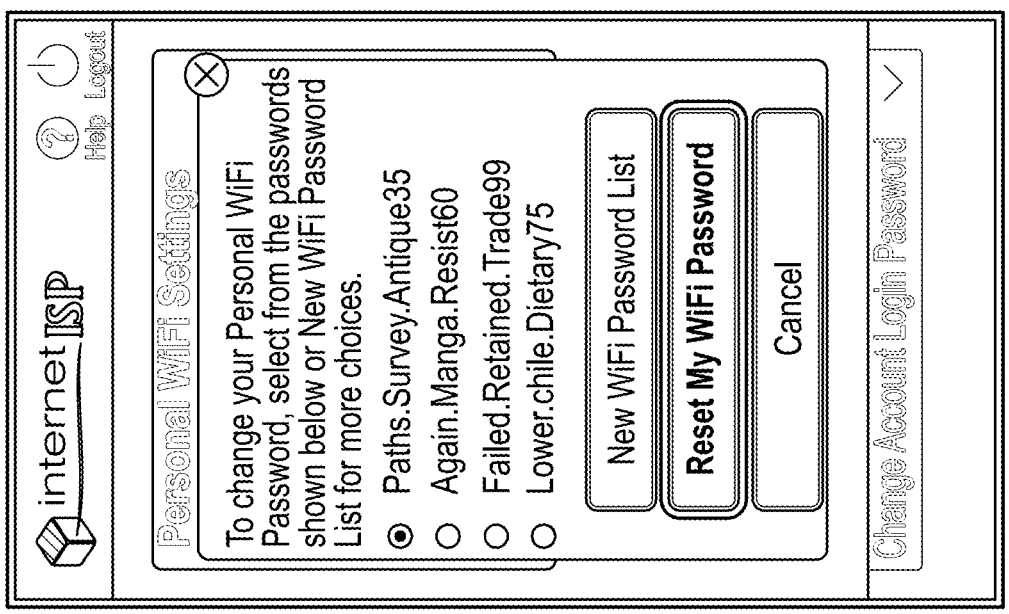
Figure 14N:
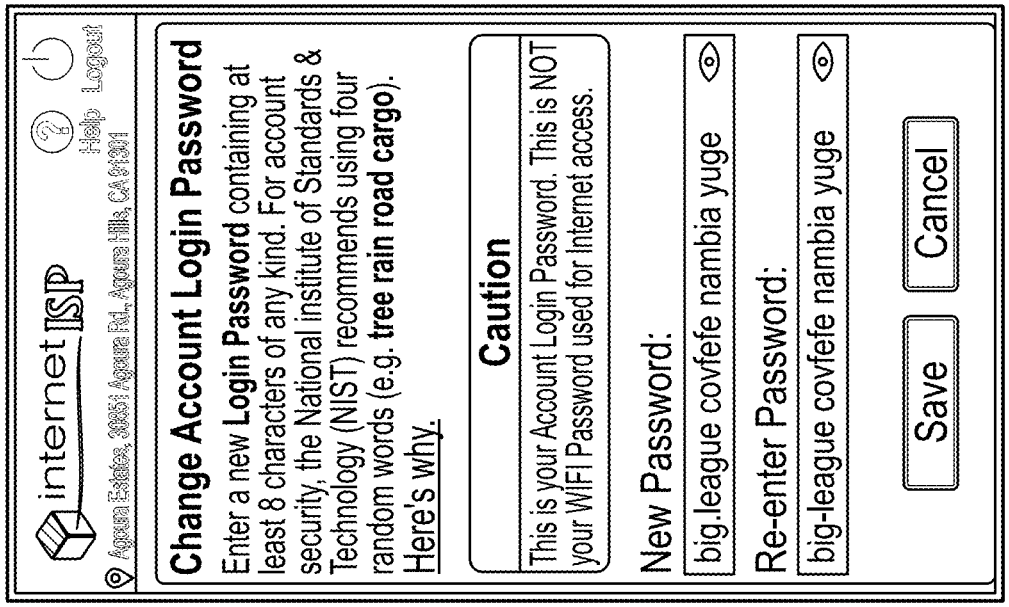
Figure 14M:
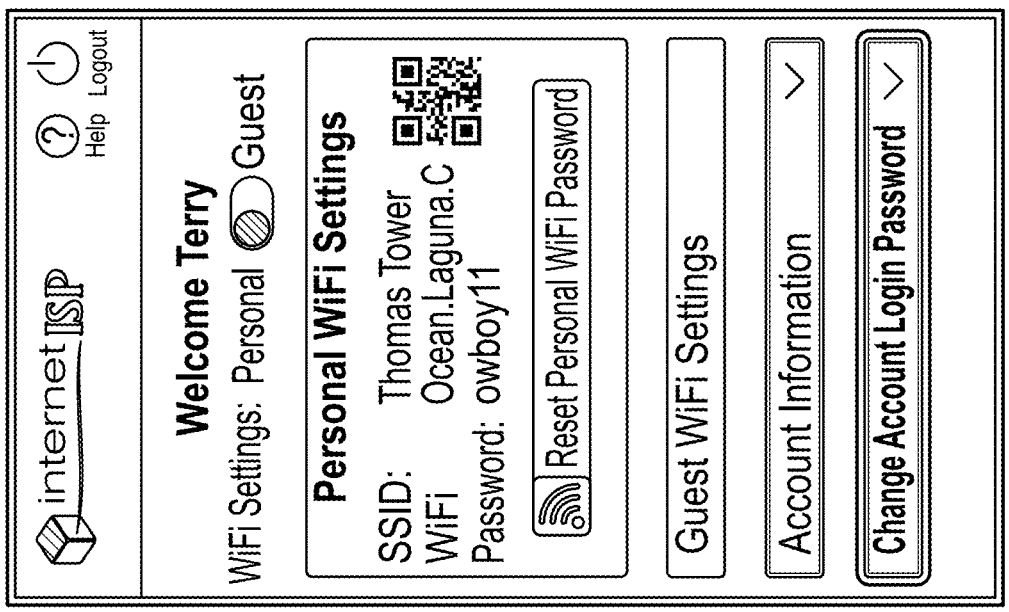
Figures 14O, 14P:
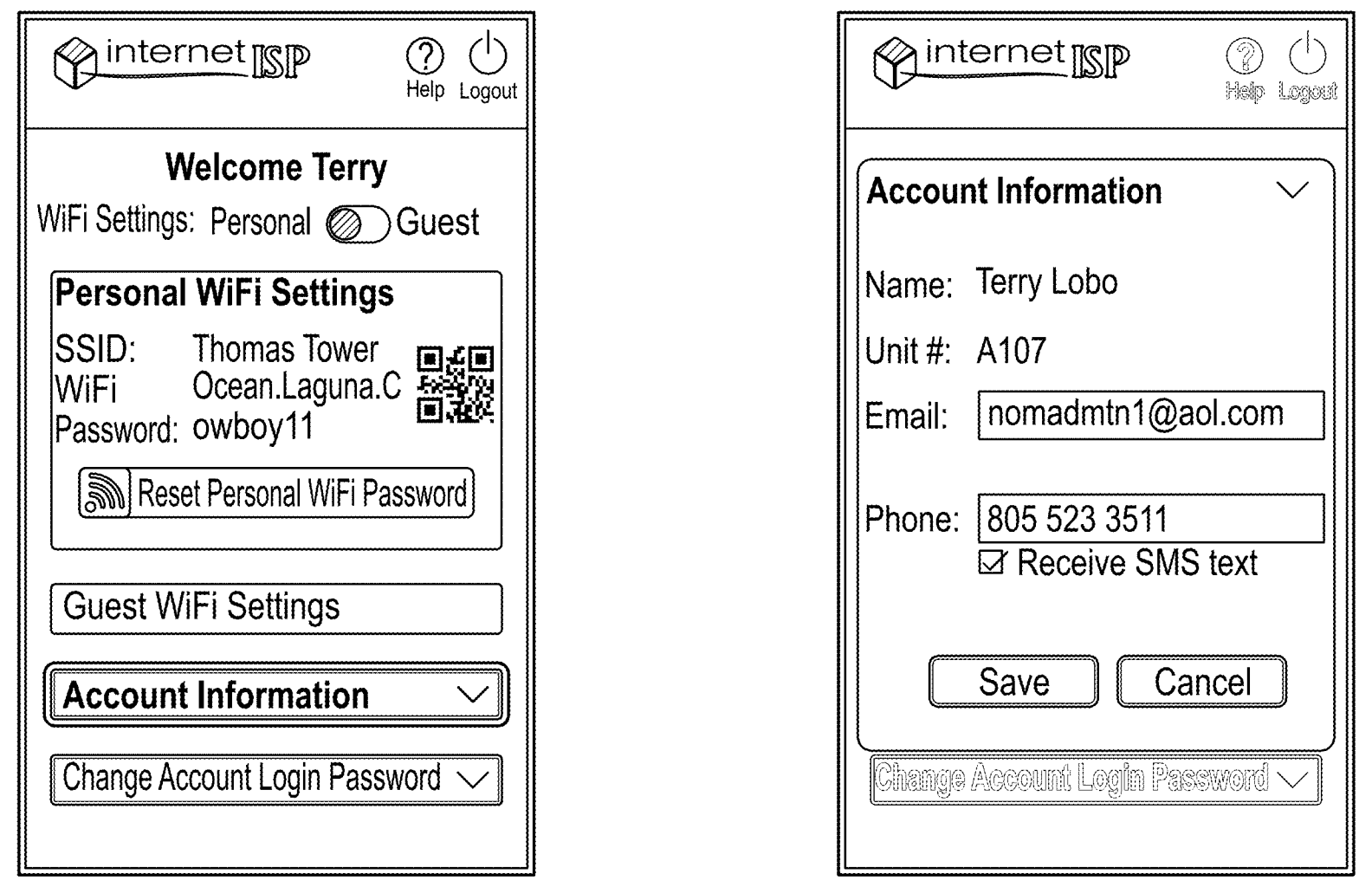
Figure 14Q:
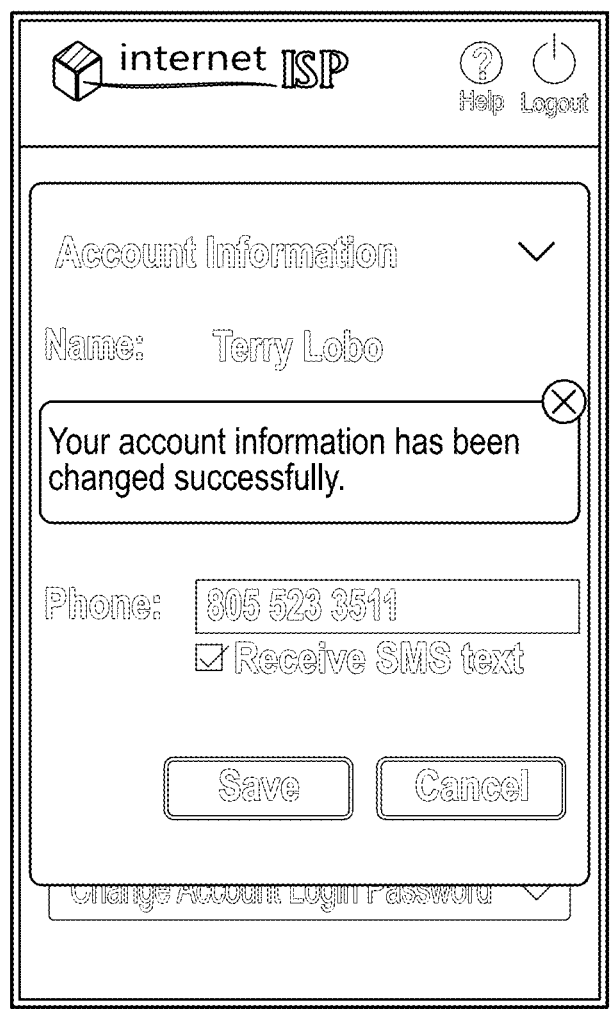

FIGS. 14A-14Q illustrate user interfaces that can be used to implement one or more of the techniques described herein. For example, the cloud-hosted portal and the user device described herein can be used to implement the features and techniques illustrated in FIGS. 14A-14Q.

FIG. 14A shows a logon user interface that may be presented to the user (e.g., resident at an MDU property). For example, the personalized move-in letter provided to the resident may include the email and passphrase that the resident can enter.

FIG. 14B shows a welcome user interface that may be presented to the resident after the user successfully logs onto the network. As shown in FIG. 14B, the user interface allows the user to access his personal Wi-Fi settings as well as his guest Wi-Fi settings from a single screen and allows the user to toggle/switch between the two sets of settings with a user interface button.

FIG. 14C shows the guest Wi-Fi settings as well as a user interface element that can be activated by the user to reset the guest Wi-Fi password.

FIG. 14D shows a warning screen displayed to the user upon the user's activation of the "reset guest Wi-Fi password" button, letting the user know that the devices connected to the guest Wi-Fi will need to be reconfigured with the new guest Wi-Fi password (once the guest Wi-Fi password is changed) and that the old guest Wi-Fi password will expire immediately.

FIG. 14E shows a guest password selection screen in which numerous guest password options (e.g., automatically generated by the system according to security guidelines) are presented for the user's selection. In some implementations, these guest password options do not include another password used by another resident or guest using the same SSID (or associated with the same MDU property). The screen also includes user interface elements for displaying a new set of guest password options, for resetting the guest Wi-Fi password, and for canceling the guest password change request. Although not shown, the screen may also include a user interface element for receiving the user's custom Wi-Fi password. In such a case, the Wi-Fi controller may perform a check to make sure that no other resident or guest is using the user-specified password (and reject the user-specified password if another user is using the same password).

FIG. 14F shows a confirmation message displayed to the user upon successfully changing the guest Wi-Fi password, indicating the old guest Wi-Fi password has expired and the devices using the old guest Wi-Fi password have been disconnected.

FIG. 14G shows a confirmation email sent to the user upon successfully changing the guest Wi-Fi password.

FIG. 14H shows the personal Wi-Fi settings as well as a user interface element that can be activated by the user to reset the personal Wi-Fi password. Although not shown, the user interface shown in FIG. 14H may include the current service level/tier associated with the user (e.g., bandwidth levels) and also include a user interface element for updating the service level/tier to a higher or lower service level/tier.

FIG. 14I shows a warning screen displayed to the user upon the user's activation of the "reset personal Wi-Fi password" button, letting the user know that the devices connected to the personal Wi-Fi will need to be reconfigured with the new personal Wi-Fi password (once the personal Wi-Fi password is changed), that the old personal Wi-Fi password will remain active for 2 hours (a grace period), and that the devices connected to the Wi-Fi network using the old personal Wi-Fi password would be disconnected after the grace period expires.

FIG. 14J shows a personal password selection screen in which numerous personal password options (e.g., automatically generated by the system according to security guidelines) are presented for the user's selection. In some implementations, these personal password options do not include another password used by another resident or guest using the same SSID (or associated with the same MDU property). The screen also includes user interface elements for displaying a new set of personal password options, for resetting the personal Wi-Fi password, and for canceling the personal password change request. Although not shown, the screen may also include a user interface element for receiving the user's custom Wi-Fi password. In such a case, the Wi-Fi controller may perform a check to make sure that no other resident or guest is using the user-specified password (and reject the user-specified password if another user is using the same password).

FIG. 14K shows a confirmation message displayed to the user upon successfully changing the personal Wi-Fi password, indicating the old personal Wi-Fi password has expired and the devices using the old guest Wi-Fi password will be disconnected once the 2-hour grace period expires.

FIG. 14L shows a confirmation email sent to the user upon successfully changing the personal Wi-Fi password.

FIG. 14M shows the Wi-Fi settings screen including a user interface element for changing the user's account login password.

FIG. 14N shows the account login password change screen that allows the user to enter a new password and save the new password.

FIG. 14O shows the Wi-Fi settings screen including a user interface element for changing the user's account information.

FIG. 14P shows the account information change screen that allows the user to view and edit the user's current account information such as name, unit number, email, phone number, and whether to receive text from the property.

FIG. 14Q shows a confirmation message displayed to the user upon successfully changing the user's account information.

Example User Interfaces (for Property Managers)

FIGS. 15A-15D illustrate user interfaces that can be used to implement one or more of the techniques described herein. For example, the cloud-hosted portal and the user device described herein can be used to implement the features and techniques illustrated in FIGS. 15A-15D.

Figure 15A:
FIGS. 15A-15D illustrate example user interfaces usable by a property manager of an MDU property to manage resident accounts in accordance with aspects of this disclosure.

FIG. 15A shows a login screen from which a user (e.g., a property manager at an MDU property) can log on to the Wi-Fi network management portal.

Figure 15B:
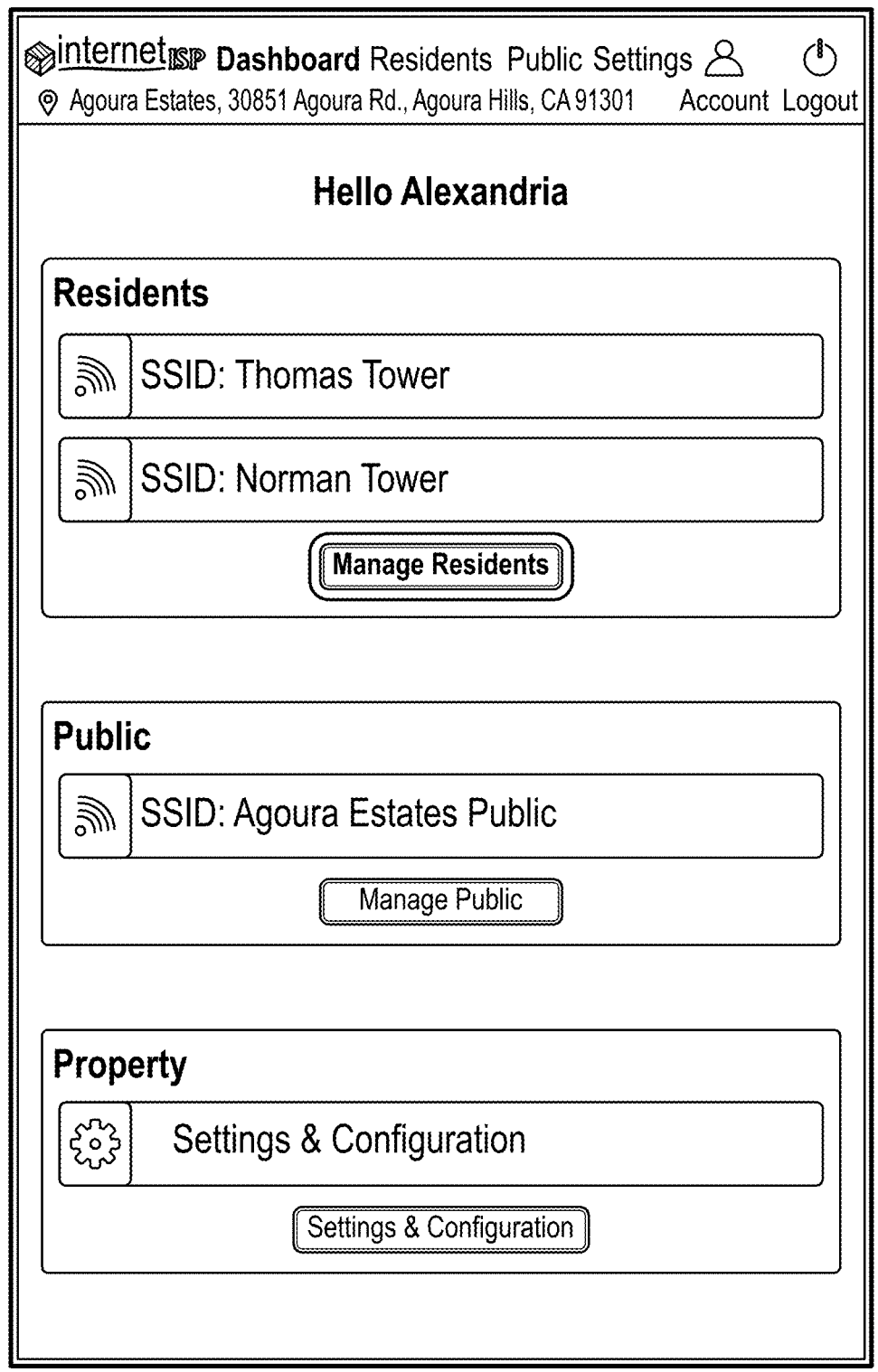

FIG. 15B shows an overview screen including a list of resident Wi-Fi networks managed by the property, a list of public Wi-Fi networks managed by the property, and property settings. To add, delete, or update resident-specific settings, the user can activate the "manage residents" button, and to add, delete, or update public settings, the user can activate the "manage public" button.

Figure 15C:
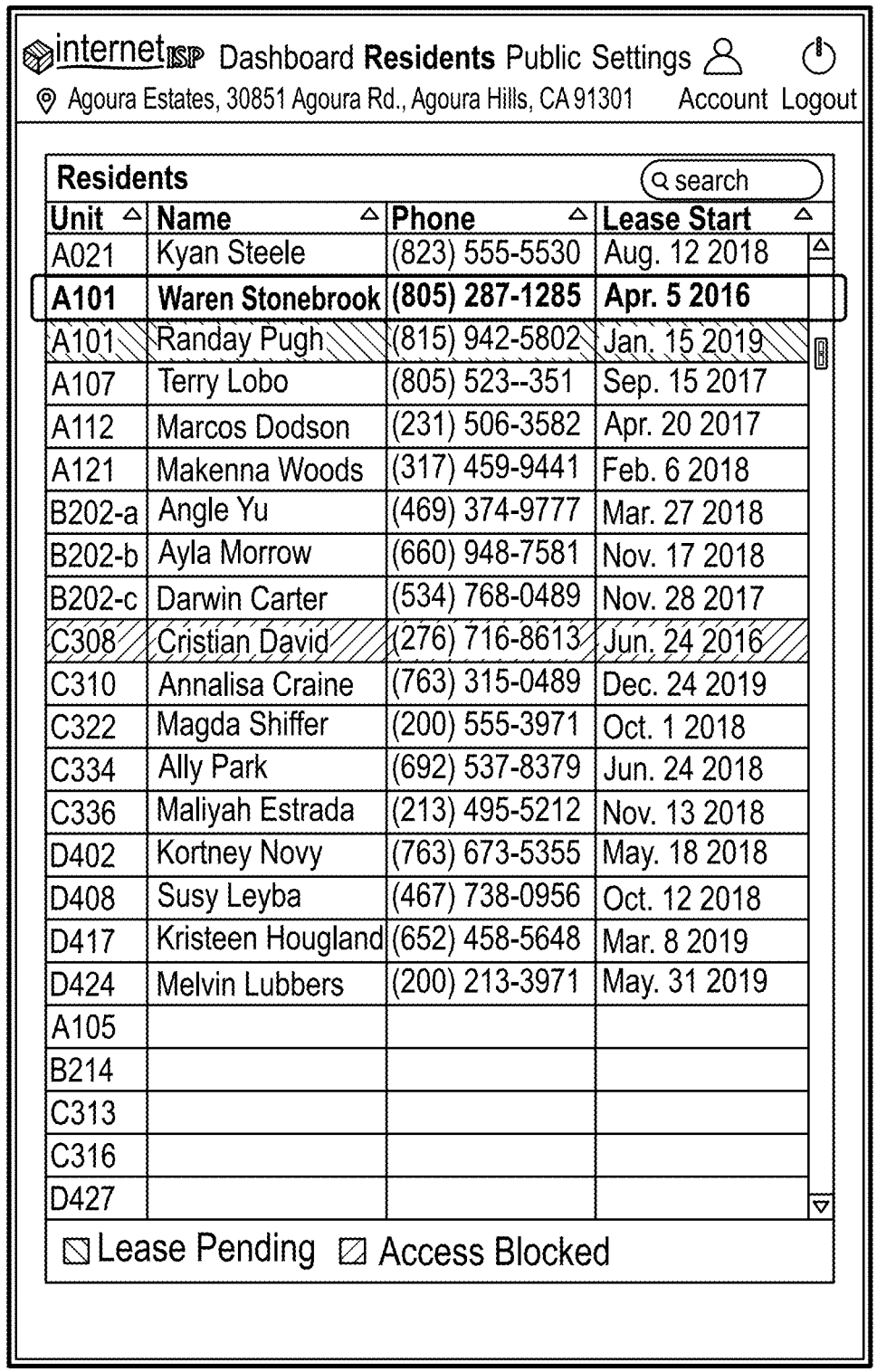

FIG. 15C shows a list of residents at the property and their information. The user can select one of the residents to update the Wi-Fi settings for that resident.

Figure 15D:

FIG. 15D shows a resident settings screen indicating detailed information about the resident such as name, email phone, service tier (e.g., bandwidth level), lease start, lease end, availability of Wi-Fi access, assigned SSID(s), account password, and the like.

Example Implementations (EIs)

Some enumerated example implementations (EIs) are provided in this section, without limitation.

EI 1: A system comprising: a storage device configured to store user data associated with a plurality of user accounts for a wireless network; and a server comprising computer hardware and configured to at least: receive a user login request from a user device, the request including user credentials associated with a first user account of the plurality of user accounts for the wireless network; transmit, to the user device, pre shared key (PSK) change UI data usable to output a PSK change UI on the user device; receive an indication that the user wishes to change the user's personal PSK; transmit, to the user device, PSK change options data usable to output PSK options on the user device; receive an indication that the user has provided a new personal PSK; execute, based on the indication that the user has provided the new personal PSK, a PSK change API associated with a Wi-Fi controller configured to manage Wi-Fi access points accessible by the user device; receive acknowledgement from the Wi-Fi controller that the user's PSK has been installed at the Wi-Fi access points such that the user can access the Wi-Fi access points using the new personal PSK; transmit, to the user device, that the user's PSK has been changed to the new personal PSK; after a grace period associated with the PSK change, execute a PSK removal API associated with the Wi-Fi controller to remove a previous personal PSK associated with the user from the Wi-Fi access points; and receive acknowledgement from the Wi-Fi controller that the previous personal PSK associated with the user has been removed from the Wi-Fi access points such that the user device can no longer access the Wi-Fi access points using the previous personal PSK.

EI 2: The system of any preceding EI or any combination of the preceding EIs, wherein the server is further configured to generate the PSK change options data, wherein the PSK change options data includes two or more passphrase options selectable by the user.

EI 3: The system of any preceding EI or any combination of the preceding EIs, wherein the server is further configured to: receive an indication that the user wishes to change the user's guest PSK to a new guest PSK; execute a guest PSK change API associated with the Wi-Fi controller; and without waiting for the grace period, execute a guest PSK removal API associated with the Wi-Fi controller to remove a previous guest PSK from the Wi-Fi access points.

EI 4: The system of any preceding EI or any combination of the preceding EIs, wherein the new guest PSK is different from the new personal PSK.

EI 5: The system of any preceding EI or any combination of the preceding EIs, wherein the server is further configured to cause each device connecting to the wireless network using the new personal PSK to be connected to a virtual personal area network.

EI 6: The system of any preceding EI or any combination of the preceding EIs, wherein the server is further configured to prevent a guest device connecting to the wireless network using the new guest PSK from accessing the virtual personal area network.

EI 7: A computer implemented method comprising: receiving a user login request from a user device, the request including user credentials associated with a first user account of the plurality of user accounts for the wireless network; transmitting, to the user device, pre shared key (PSK) change UI data usable to output a PSK change UI on the user device; receiving an indication that the user wishes to change the user's personal PSK; transmitting, to the user device, PSK change options data usable to output PSK options on the user device; receiving an indication that the user has provided a new personal PSK; executing, based on the indication that the user has provided the new personal PSK, a PSK change API associated with a Wi-Fi controller configured to manage Wi-Fi access points accessible by the user device; receiving acknowledgement from the Wi-Fi controller that the user's PSK has been installed at the Wi-Fi access points such that the user can access the Wi-Fi access points using the new personal PSK; transmitting, to the user device, that the user's PSK has been changed to the new personal PSK; after a grace period associated with the PSK change, executing a PSK removal API associated with the Wi-Fi controller to remove a previous personal PSK associated with the user from the Wi-Fi access points; and receiving acknowledgement from the Wi-Fi controller that the previous personal PSK associated with the user has been removed from the Wi-Fi access points such that the user device can no longer access the Wi-Fi access points using the previous personal PSK.

EI 8: The computer implemented method of any preceding EI or any combination of the preceding EIs, further comprising generating the PSK change options data, wherein the PSK change options data includes two or more passphrase options selectable by the user.

EI 9: The computer implemented method of any preceding EI or any combination of the preceding EIs, further comprising: receiving an indication that the user wishes to change the user's guest PSK to a new guest PSK; executing a guest PSK change API associated with a Wi-Fi controller configured to access Wi-Fi access points associated with the user's user account; and without waiting for the grace period, executing a guest PSK removal API associated with the Wi-Fi controller to remove a previous guest PSK from the Wi-Fi access points.

EI 10: The computer implemented method of any preceding EI or any combination of the preceding EIs, wherein the new guest PSK is different from the new personal PSK.

EI 11: The computer implemented method of any preceding EI or any combination of the preceding EIs, further comprising causing each device connecting to the wireless network using the new personal PSK to be connected to a virtual personal area network.

EI 12: The computer implemented method of any preceding EI or any combination of the preceding EIs, further comprising preventing a guest device connecting to the wireless network using the new guest PSK from accessing the virtual personal area network.

EI 13: The computer implemented method of any preceding EI or any combination of the preceding EIs, further comprising transmitting, to the user device, configuration toggle UI data usable to generate a first UI panel indicating a set of personal wireless configuration settings and a second UI panel indicating a set of guest wireless configuration settings to enable toggling between the first UI panel and the second UI panel.

EI 14: Non transitory computer readable physical storage storing instructions that, when executed by a computing system, cause the computing system to at least: receive a user login request from a user device, the request including user credentials associated with a first user account of the plurality of user accounts for the wireless network; transmit, to the user device, pre shared key (PSK) change UI data usable to output a PSK change UI on the user device; receive an indication that the user wishes to change the user's personal PSK; transmit, to the user device, PSK change options data usable to output PSK options on the user device; receive an indication that the user has provided a new personal PSK; execute, based on the indication that the user has provided the new personal PSK, a PSK change API associated with a Wi-Fi controller configured to manage Wi-Fi access points accessible by the user device; receive acknowledgement from the Wi-Fi controller that the user's PSK has been installed at the Wi-Fi access points such that the user can access the Wi-Fi access points using the new personal PSK; transmit, to the user device, that the user's PSK has been changed to the new personal PSK; after a grace period associated with the PSK change, execute a PSK removal API associated with the Wi-Fi controller to remove a previous personal PSK associated with the user from the Wi-Fi access points; and receive acknowledgement from the Wi-Fi controller that the previous personal PSK associated with the user has been removed from the Wi-Fi access points such that the user device can no longer access the Wi-Fi access points using the previous personal PSK.

EI 15: The non-transitory computer readable physical storage of any preceding EI or any combination of the preceding EIs, storing further instructions, that when executed by the computing system, cause the computing system to generate the PSK change options data, wherein the PSK change options data includes two or more passphrase options selectable by the user.

EI 16: The non-transitory computer readable physical storage of any preceding EI or any combination of the preceding EIs, storing further instructions, that when executed by the computing system, cause the computing system to: receive an indication that the user wishes to change the user's guest PSK to a new guest PSK; execute a guest PSK change API associated with the Wi-Fi controller; and without waiting for the grace period, execute a guest PSK removal API associated with the Wi-Fi controller to remove a previous guest PSK from the Wi-Fi access points.

EI 17: The non-transitory computer readable physical storage of any preceding EI or any combination of the preceding EIs, wherein the new guest PSK is different from the new personal PSK.

EI 18: The non-transitory computer readable physical storage of any preceding EI or any combination of the preceding EIs, storing further instructions, that when executed by the computing system, cause the computing system to cause each device connecting to the wireless network using the new personal PSK to be connected to a virtual personal area network.

EI 19: The non-transitory computer readable physical storage of any preceding EI or any combination of the preceding EIs, storing further instructions, that when executed by the computing system, cause the computing system to prevent a guest device connecting to the wireless network using the new guest PSK from accessing the virtual personal area network.

EI 20: The non-transitory computer readable physical storage of any preceding EI or any combination of the preceding EIs, storing further instructions, that when executed by the computing system, cause the computing system to transmit, to the user device, configuration toggle UI data usable to generate a first UI panel indicating a set of personal wireless configuration settings and a second UI panel indicating a set of guest wireless configuration settings to enable toggling between the first UI panel and the second UI panel.

EI 21: A mobile device comprising: one or more processors; a display in communication with the one or more processors; one or more memories storing computer-executable instructions, which, when executed by the one or more processors, cause the one or more processors to: receive a user request to reset a personal pre-shared key (PSK) associated with a user account; output a user confirmation page on the display; receive user acknowledgement that the user wishes to proceed with the requested PSK change; output a password option user interface (UI) on the display, the password option UI including one or more suggested PSKs for user selection, a UI element for requesting additional PSKs, and a UI element for canceling the PSK change; receive a user selection of one of the suggested PSKs; and output a confirmation UI on the display, the confirmation UI indicating that the personal PSK has been changed to the PSK selected by the user; and transmit the changed personal PSK to a Wi-Fi access point for Internet access.

Other Considerations

It is to be understood that not necessarily all objects or advantages may be achieved in accordance with any particular implementation described herein. Thus, for example, those skilled in the art will recognize that certain implementations may be configured to operate in a manner that achieves or optimizes one advantage or group of advantages as taught herein without necessarily achieving other objects or advantages as may be taught or suggested herein.

Many other variations than those described herein will be apparent from this disclosure. For example, depending on the implementation, certain acts, events, or functions of any of the algorithms described herein can be performed in a different sequence, can be added, merged, or left out altogether (e.g., not all described acts or events are necessary for the practice of the algorithms). Moreover, in certain implementations, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the implementations disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the implementations disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can include electrical circuitry configured to process computer-executable instructions. In another implementation, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the implementations disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain implementations include, while other implementations do not include, certain features, elements, and/or states. Thus, such conditional language is not generally intended to imply that features, elements and/or states are in any way required for one or more implementations or that one or more implementations necessarily include logic for deciding, with or without author input or prompting, whether these features, elements and/or states are included or are to be performed in any particular implementation. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the present disclosure in which elements or functions may be deleted, executed out of order from that shown, or discussed, including substantially concurrently or in reverse order, depending on the functionality involved as would be understood by those skilled in the art.

Unless otherwise explicitly stated, articles such as "a", "an", or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various implementations, it can be understood that various omissions, substitutions, and changes in the form and details of the devices or algorithms illustrated can be made without departing from the spirit of the disclosure. As can be recognized, certain implementations described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:
    a storage device configured to store user data associated with a plurality of user accounts for a wireless network; and
    a server comprising computer hardware and configured to at least:
        receive a user login request from a user device, the request including user credentials associated with a first user account of the plurality of user accounts for the wireless network;
        transmit, to the user device, pre-shared key (PSK) change UI data usable to output a PSK change UI on the user device;
        receive an indication that the user wishes to change the user's personal PSK;
        transmit, to the user device, PSK change options data usable to output PSK options on the user device;
        receive an indication that the user has provided a new personal PSK;
        execute, based on the indication that the user has provided the new personal PSK, a PSK change API associated with a Wi-Fi controller configured to manage Wi-Fi access points accessible by the user device;
        receive acknowledgement from the Wi-Fi controller that the user's PSK has been installed at the Wi-Fi access points such that the user can access the Wi-Fi access points using the new personal PSK;
        transmit, to the user device, that the user's PSK has been changed to the new personal PSK;
        after a grace period associated with the PSK change, execute a PSK removal API associated with the Wi-Fi controller to remove a previous personal PSK associated with the user from the Wi-Fi access points; and
        receive acknowledgement from the Wi-Fi controller that the previous personal PSK associated with the user has been removed from the Wi-Fi access points such that the user device can no longer access the Wi-Fi access points using the previous personal PSK.

2. The system of claim 1, wherein the server is further configured to generate the PSK change options data, wherein the PSK change options data includes two or more passphrase options selectable by the user.

3. The system of claim 1, wherein the server is further configured to:
    receive an indication that the user wishes to change the user's guest PSK to a new guest PSK;
    execute a guest PSK change API associated with the Wi-Fi controller; and
    without waiting for the grace period, execute a guest PSK removal API associated with the Wi-Fi controller to remove a previous guest PSK from the Wi-Fi access points.

4. The system of claim 3, wherein the new guest PSK is different from the new personal PSK.

5. The system of claim 1, wherein the server is further configured to cause each device connecting to the wireless network using the new personal PSK to be connected to a virtual personal area network.

6. The system of claim 5, wherein the server is further configured to prevent a guest device connecting to the wireless network using the new guest PSK from accessing the virtual personal area network.

7. A computer-implemented method comprising:
receiving a user login request from a user device, the request including user credentials associated with a first user account of the plurality of user accounts for the wireless network;
transmitting, to the user device, pre-shared key (PSK) change UI data usable to output a PSK change UI on the user device;
receiving an indication that the user wishes to change the user's personal PSK;
transmitting, to the user device, PSK change options data usable to output PSK options on the user device;
receiving an indication that the user has provided a new personal PSK;
executing, based on the indication that the user has provided the new personal PSK, a PSK change API associated with a Wi-Fi controller configured to manage Wi-Fi access points accessible by the user device;
receiving acknowledgement from the Wi-Fi controller that the user's PSK has been installed at the Wi-Fi access points such that the user can access the Wi-Fi access points using the new personal PSK;
transmitting, to the user device, that the user's PSK has been changed to the new personal PSK;
after a grace period associated with the PSK change, executing a PSK removal API associated with the Wi-Fi controller to remove a previous personal PSK associated with the user from the Wi-Fi access points; and
receiving acknowledgement from the Wi-Fi controller that the previous personal PSK associated with the user has been removed from the Wi-Fi access points such that the user device can no longer access the Wi-Fi access points using the previous personal PSK.

8. The computer-implemented method of claim 7, further comprising generating the PSK change options data, wherein the PSK change options data includes two or more passphrase options selectable by the user.

9. The computer-implemented method of claim 7, further comprising:
receiving an indication that the user wishes to change the user's guest PSK to a new guest PSK;
executing a guest PSK change API associated with a Wi-Fi controller configured to access Wi-Fi access points associated with the user's user account; and
without waiting for the grace period, executing a guest PSK removal API associated with the Wi-Fi controller to remove a previous guest PSK from the Wi-Fi access points.

10. The computer-implemented method of claim 9, wherein the new guest PSK is different from the new personal PSK.

11. The computer-implemented method of claim 7, further comprising causing each device connecting to the wireless network using the new personal PSK to be connected to a virtual personal area network.

12. The computer-implemented method of claim 11, further comprising preventing a guest device connecting to the wireless network using the new guest PSK from accessing the virtual personal area network.

13. The computer-implemented method of claim 7, further comprising transmitting, to the user device, configuration toggle UI data usable to generate a first UI panel indicating a set of personal wireless configuration settings and a second UI panel indicating a set of guest wireless configuration settings to enable toggling between the first UI panel and the second UI panel.

14. Non-transitory computer-readable physical storage storing instructions that, when executed by a computing system, cause the computing system to at least:
receive a user login request from a user device, the request including user credentials associated with a first user account of the plurality of user accounts for the wireless network;
transmit, to the user device, pre-shared key (PSK) change UI data usable to output a PSK change UI on the user device;
receive an indication that the user wishes to change the user's personal PSK;
transmit, to the user device, PSK change options data usable to output PSK options on the user device;
receive an indication that the user has provided a new personal PSK;
execute, based on the indication that the user has provided the new personal PSK, a PSK change API associated with a Wi-Fi controller configured to manage Wi-Fi access points accessible by the user device;
receive acknowledgement from the Wi-Fi controller that the user's PSK has been installed at the Wi-Fi access points such that the user can access the Wi-Fi access points using the new personal PSK;
transmit, to the user device, that the user's PSK has been changed to the new personal PSK;
after a grace period associated with the PSK change, execute a PSK removal API associated with the Wi-Fi controller to remove a previous personal PSK associated with the user from the Wi-Fi access points; and
receive acknowledgement from the Wi-Fi controller that the previous personal PSK associated with the user has been removed from the Wi-Fi access points such that the user device can no longer access the Wi-Fi access points using the previous personal PSK.

15. The non-transitory computer-readable physical storage of claim 14, storing further instructions, that when executed by the computing system, cause the computing system to generate the PSK change options data, wherein the PSK change options data includes two or more passphrase options selectable by the user.

16. The non-transitory computer-readable physical storage of claim 14, storing further instructions, that when executed by the computing system, cause the computing system to:
receive an indication that the user wishes to change the user's guest PSK to a new guest PSK;
execute a guest PSK change API associated with the Wi-Fi controller; and
without waiting for the grace period, execute a guest PSK removal API associated with the Wi-Fi controller to remove a previous guest PSK from the Wi-Fi access points.

17. The non-transitory computer-readable physical storage of claim 16, wherein the new guest PSK is different from the new personal PSK.

18. The non-transitory computer-readable physical storage of claim 14, storing further instructions, that when executed by the computing system, cause the computing system to cause each device connecting to the wireless network using the new personal PSK to be connected to a virtual personal area network.

19. The non-transitory computer-readable physical storage of claim 18, storing further instructions, that when executed by the computing system, cause the computing system to prevent a guest device connecting to the wireless network using the new guest PSK from accessing the virtual personal area network.

20. The non-transitory computer-readable physical storage of claim 14, storing further instructions, that when executed by the computing system, cause the computing system to transmit, to the user device, configuration toggle UI data usable to generate a first UI panel indicating a set of personal wireless configuration settings and a second UI panel indicating a set of guest wireless configuration settings to enable toggling between the first UI panel and the second UI panel.

* * * * *